(12) United States Patent
Pelta et al.

(10) Patent No.: US 12,369,539 B2
(45) Date of Patent: Jul. 29, 2025

(54) SYSTEM AND METHOD FOR MANAGING IRRIGATION OF A FIELD PLOT FOR A GROWING SEASON

(71) Applicant: Manna Irrigation Ltd., Gvat (IL)

(72) Inventors: Ran Pelta, Golan Heights (IL); Ofer Beeri, Kibbutz Yagur (IL); Tal Shilo, Yokneam (IL); Shay Mey-tal, Herzliya (IL)

(73) Assignee: Manna Irrigation Ltd., Gvat (IL)

( * ) Notice: Subject to any disclaimer, the term of this patent is extended or adjusted under 35 U.S.C. 154(b) by 412 days.

(21) Appl. No.: 18/012,166

(22) PCT Filed: Jun. 21, 2021

(86) PCT No.: PCT/IL2021/050752
§ 371 (c)(1),
(2) Date: Dec. 21, 2022

(87) PCT Pub. No.: WO2021/260687
PCT Pub. Date: Dec. 30, 2021

(65) Prior Publication Data
US 2023/0270060 A1    Aug. 31, 2023

(30) Foreign Application Priority Data
Jun. 22, 2020  (IL) .......................... 275559

(51) Int. Cl.
*A01G 25/16* (2006.01)
*G05B 19/042* (2006.01)

(52) U.S. Cl.
CPC ........... *A01G 25/16* (2013.01); *G05B 19/042* (2013.01); *G05B 2219/2625* (2013.01)

(58) Field of Classification Search
CPC .... A01G 25/16; A01G 25/167; G05B 19/042; G05B 2219/2625
See application file for complete search history.

(56) References Cited

U.S. PATENT DOCUMENTS 10,188,049 B1   1/2019  Emanuel
2016/0057949 A1* 3/2016 Williams ............. A01G 25/167
                                                          700/275
(Continued)

FOREIGN PATENT DOCUMENTS

WO    2019008570 A1    1/2019
WO    2019198072 A1   10/2019

OTHER PUBLICATIONS

Sanyogita Andriyas, "Analysis of Irrigation Decision Behavior and Forecasting Future Irrigation Decisions," Utah State University, Dec. 2012 (Year: 2012).*

(Continued)

*Primary Examiner* — Chad G Erdman
(74) *Attorney, Agent, or Firm* — FULLER IP LAW LLC; Rodney J. Fuller

(57) ABSTRACT

An irrigation management method constituted of: applying a global RSP model to received GIV values to forecast global RSP values; and applying a plot-specific RSP model to receive PS IV values to forecast plot-specific RSP values, wherein responsive to the forecast global and plot-specific RSP values, a forecast ETO and measured plot-specific RSP values, the method is further constituted of: generating an ETc curve; responsive to the generated ETc curve, determining a growing season water amount for the field plot and/or determining a next irrigation water amount for the field plot; and outputting to a device the determined growing season water amount and/or the determined next irrigation water amount such that irrigation of the field plot can be adjusted.

20 Claims, 14 Drawing Sheets

(56) References Cited

U.S. PATENT DOCUMENTS

2019/0230875 A1    8/2019   Mewes
2022/0304262 A1*   9/2022   Ciarletti ................. A01G 25/16

OTHER PUBLICATIONS

Abyaneh et al., (2011) Determination of water requirement, single and dual crop coefficient of garlic ('Allium sativum') in the cold semi-arid climate. Australian Journal of Crop Science 5(8): 1050-1054.
Allen and Pereira (2009) Estimating crop coefficients from fraction of ground cover and height. Irrig Sci 28: 17-34.
Beeri et al., (2019) Accuracy of crop coefficient estimation methods based on satellite imagery. In: Precision agriculture 19; edited by: John V. Stafford. Wageningen Academic Publishers. pp. 437-444. Abstract.
Chlingaryan et al., (2018) Machine learning approaches for crop yield prediction and nitrogen status estimation in precision agriculture: A review. Computers and Electronics in Agriculture 151: 61-69. Abstract.
Hargreaves and Samani (1985) Reference Crop Evapotranspiration from Temperature. Applied Engineering in Agriculture 1(2): 96-99. Abstract.
Helman et al., (2017) A biophysical approach using water deficit factor for daily estimations of evapotranspiration and CO2 uptake in Mediterranean environments. Biogeosciences 14(17): 3909-3926.
Houtekamer and Mitchell (1998) Data Assimilation Using an Ensemble Kalman Filter Technique. Monthly Weather Review 126(3): 796-811.
Jackson et al., (1988) A reexamination of the crop water stress index. Irrigation Science 9: 309-317.
Johnson and Trout (2012) Satellite NDVI Assisted Monitoring of Vegetable Crop Evapotranspiration in California's San Joaquin Valley. Remote Sensing 4: 439-455.
LeMone et al., (2007) Influence of Land Cover and Soil Moisture on the Horizontal Distribution of Sensible and Latent Heat Fluxes in Southeast Kansas during IHOP_2002 and CASES-97. Journal of Hydrometeorology 8: 68-87.
Nagler et al., (2013) Estimating Riparian and Agricultural Actual Evapotranspiration by Reference Evapotranspiration and MODIS Enhanced Vegetation Index. Remote Sensing 5: 3849-3871.
O'Shaughnessy et al., (2012) A crop water stress index and time threshold for automatic irrigation scheduling of grain sorghum. Agricultural Water Management 107: 122-132.
Snyder et al., (2006) A fuel dryness index for grassland fire-danger assessment. Agricultural and Forest Meteorology 139(1-2): 1-11.
Tasumi et al., (2006) Calibrating Satellite-Based Vegetation Indices to Estimate Evapotranspiration and Crop Coefficients. Ground Water and Surface Water Under Stress: Competition, Interaction, Solutions, A USCID Water Management Conference, Boise, Idaho, USA, Oct. 25-28, 2006. Published by U.S. Committee on Irrigation and Drainage; pp. 103-112.
Tewes et al., (2020) New Approaches for the Assimilation of LAI Measurements into a Crop Model Ensemble to Improve Wheat Biomass Estimations. Agronomy 10(3): 446; 21 pages.
Wilson et al., (2002) Energy partitioning between latent and sensible heat flux during the warm season at FLUXNET sites. Water Resources Research 38(12): 1294; 11 pages.
Analysis of Irrigation Decision Behavior and Forecasting Future Irrigation Decisions. Sanyogita Andriyas, Utah State University, Dec. 2012 Sanyogita Andriyas Dec. 31, 2012 (Dec. 31, 2012). Dissert., Retrieved from: https://digitalcommons.usu.edu/cgi/viewcontent.cgi?article=2374&context=etd. 135 pages.

* cited by examiner

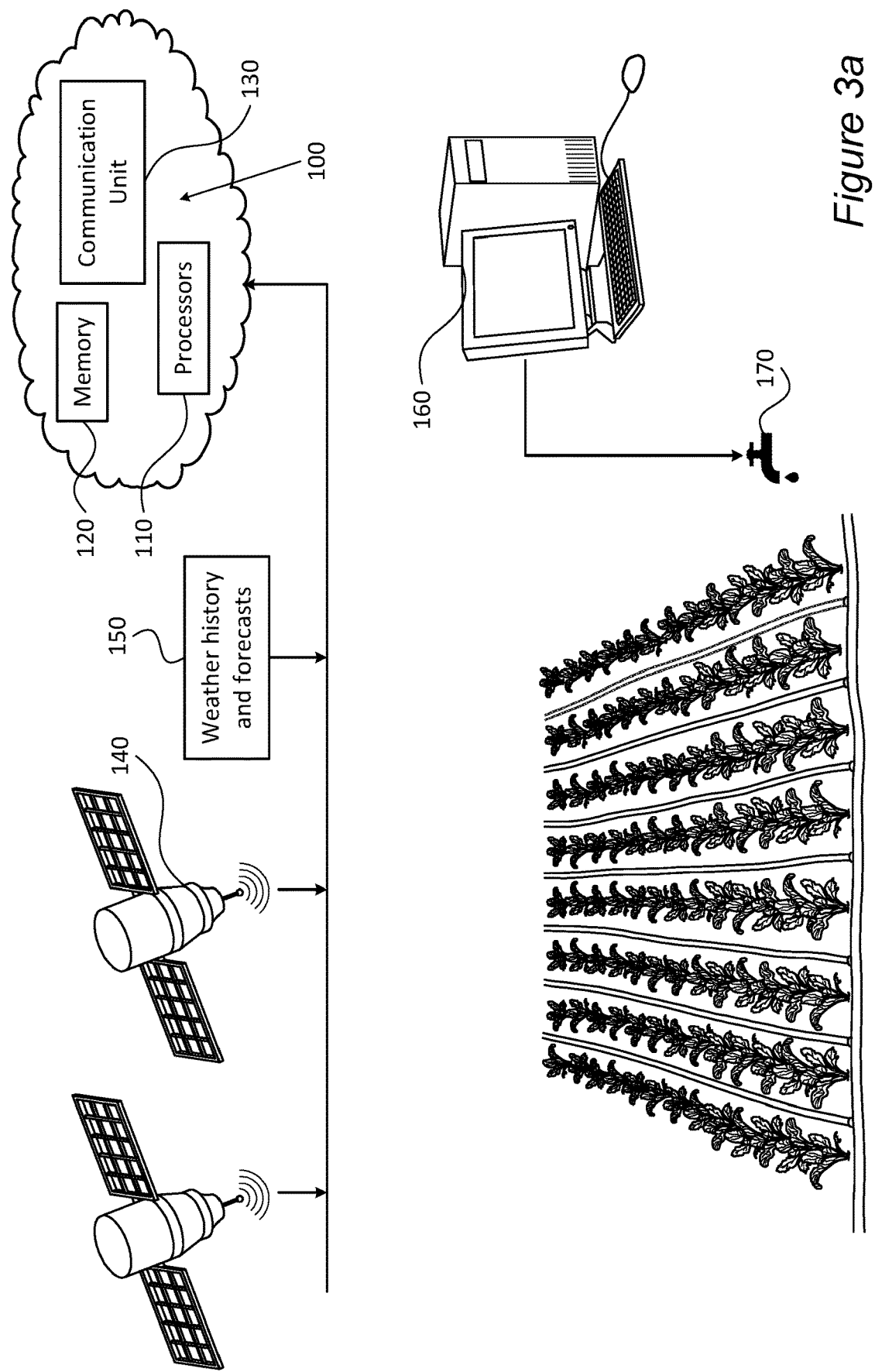

SYSTEM AND METHOD FOR MANAGING IRRIGATION OF A FIELD PLOT FOR A GROWING SEASON

CROSS-REFERENCE TO RELATED APPLICATIONS

This application is the U.S. National Stage of International Patent Application No. PCT/IL2021/050752, filed on Jun. 21, 2021, which claims the benefit of and priority to IL Patent Application No. 275559, filed on Jun. 22, 2020, the contents of each of which are hereby incorporated by reference in their entireties.

TECHNICAL FIELD

The present invention relates to the field of agriculture, particularly to a system and method for managing irrigation of a field plot for a growing season.

BACKGROUND

The water needs for crop development and the resulted yield are determined by the crop evapotranspiration (ETc). According to the Food and Agriculture Organization (FAO)-56 protocol (Allen R. E. et al, FAO, 1998), hereafter FAO56, ETc in non-stress conditions is calculated by multiplying the reference evapotranspiration (ET0) by the crop coefficient (Kc). FIG. 1a shows an illustrated example of these parameters during a typical growing season, where the x-axis represents time, from the start of the growing season to the end thereof, the left y-axis represents ET0 and ETc values and the right y-axis represents Kc values.

In stress conditions, ETc is calculated by multiplying the ET0 by the Kc and by a plot water stress coefficient (PWS). FIG. 1b shows an illustrated example of Kc and PWS curves during a typical growing season, where the x-axis represents time, from the start of the growing season to the end thereof, the left y-axis represents Kc values and the right y-axis represents PWS values. As described in the FAO56, ET0 is calculated from meteorology parameters, such as solar radiation (SR), air temperature (Ta), relative humidity (RH) and wind speed (WS), together with location parameters. Thus, ET0 can be calculated based on datasets from previous years before the growing season starts. This enables estimating the total water needs for any field and helps to plan the water budget for the entire farm. ET0 can be also calculated on any day of the growing season with current or forecast meteorology parameters, to account for the water needs by the crop in the future.

The Kc is unique for any crop and changes daily during the growing season according to the crop growth. The FAO56 groups these changes into four growth stages: Initial, Development, Mid-season, and Late-season. These static and global definitions can be adjusted according to local weather conditions and management practices as undertaken by state-based agriculture authorities around the world.

The Kc changes during the growing season are an example of a crop growth model. This model includes time-series data to characterize the crop life cycle. This model is employed for the decision making of agronomic actions specific for each growth stage. To ensure correct characterization of the actual growth and to adjust the generic crop model to the local conditions, it is desired to base these dynamic Kc values on crop measurements such as the vegetation fraction or leaf-area-index (Allen R. E. and Pereira L. S., 2009, Irrigation Science 28, 17-34). These Kc values can be also estimated using remote sensing products (RSP), such as spectral indices, by correlating these RSP values to the crop measurements (Johnson L. F. and Trout T. J, 2012, Remote Sensing, 4, 439-455), or by directly transforming a specific RSP to the Kc values (Tasumi, M. et al., 2006, U.S. Committee on Irrigation and Drainage, 103-112; Nagler, P. L et al., 2013, Remote Sensing 5, 3849-3871). Another option to estimate Kc during the growing season is to base the crop growth on out-of-the-field measurements, such as growing-degree-days (GDD), and adjust the crop model accordingly, such as described in U.S. Pat. No. 10,188,049, issued Jan. 29, 2019, the entire contents of which incorporated herein by reference.

The last component in the ETc calculation is the plot water stress (PWS). As opposed to the Kc, which represents the crop growth and senescence, the PWS represents the rate of daily water exhaustion, as shown in FIG. 1b. One of the uses of the PWS is to maximize the water-use-efficiency (WUE) or the relation between the output (the yield) and the input (water), by indicating the optimal time and amount for next irrigation. Because of that, the PWS is highly dependent on wetting events, particularly irrigation and precipitation events. The PWS curve changes dramatically after each wetting event, as illustrated for example in FIGS. 2a and 2b.

FIG. 2a illustrates PWS graphs in non-stress conditions and FIG. 2b illustrates PWS graphs in stress conditions. For each of FIGS. 2a and 2b, the x-axis represents time and the y-axis represents PWS values. FIG. 2a shows respective lines for the maximum PWS value (PWS_max), the minimum PWS value (PWS_min) and the optimal PWS (PWS_opt). FIG. 2a also illustrates the actual PWS lines 10. Each irrigation time is indicated as a respective $t_0$.

The PWS value is unitless and ranges from 1.0 (full crop transpiration and non-stress conditions) to ~0.0 (non-transpiration crop and maximum stress). The PWS conditions under which the crop's growth is still optimal should range between PWS_max and PWS_opt, PWS_opt being the minimum threshold for optimal irrigation management. Yet, to achieve high WUE, irrigation should be applied when PWS reaches PWS_opt and not before or after. Hence, in practice the PWS spans between PWS_opt, before the irrigation and PWS_max, after irrigation, as illustrated by PWS lines 10. Preferably, the PWS should not fall below PWS_opt, as described in PCT patent application publication WO 2019/008570, published Jan. 10, 2019, the entire contents of which incorporated herein by reference.

The difference between non-stressed and stressed conditions is the highest value of the PWS the crop reaches. For non-stressed crops, this value should be 1.0, while for stressed crops, this value (denoted PWS_high) is below 1.0, to provide a certain level of stress. FIG. 2b shows respective curves for PWS_high, PWS_min and PWS_opt. FIG. 2b also illustrates the actual PWS lines 20. Each irrigation time is indicated as a respective to. Similar to non-stressed conditions, the PWS spans between PWS_opt, before the irrigation and PWS_high, after irrigation, as illustrated by PWS lines 20. The rate of the daily PWS changes depends on weather conditions such as the vapor pressure deficit (VPD) and wind speed (Wilson K. B., et al., 2002, Water Resources Research 38, 1294), which represents the water demand by the atmosphere. Higher VPD causes a more rapid decline in PWS, from the PWS_max or PWS_high towards the PWS_opt (Jackson R. D., et al., 1988, Irrigation Science 9, 309-317).

SUMMARY

Accordingly, it is a principal object of the present invention to overcome at least some of the disadvantages of prior art irrigation systems. This is provided in one embodiment by computerized method for managing irrigation of a crop in a field plot for a growing season, the method comprising: receiving values of one or more forecast global independent variables (GIVs); applying a global remote sensing product (RSP) model to the received values of the forecast GIVs and, responsive to the applied global RSP model, determining forecast global RSP values; receiving values of forecast plot-specific independent variables (PSIVs) associated with the field plot; applying a plot-specific RSP model to the received values of the forecast PSIVs and, responsive to the applied plot-specific RSP model, determining forecast plot-specific RSP values; receiving a forecasted reference evapotranspiration (ET0) associated with the field plot; and receiving one or more actual plot-specific RSP values associated with the field plot, wherein, responsive to the forecast global RSP values, the forecast plot-specific RSP values, the forecast ET0 and the actual plot-specific RSP values, the method further comprises: generating a first crop evapotranspiration (ETc) curve; responsive to the generated first ETc curve, determining a growing season water amount for the field plot and/or determining a next irrigation water amount for the field plot; and outputting to a device the determined growing season water amount and/or the determined next irrigation water amount such that irrigation of the field plot can be adjusted.

In one embodiment, the global RSP model comprises a plurality of sub-models, each of the plurality of sub-models associated with a respective global attribute. In another embodiment, the receiving values of forecast GIVs is performed at respective predetermined intervals during the growing season, wherein the receiving values of forecast PSIVs is performed at respective predetermined intervals during the growing season, and wherein the receiving actual plot-specific RSP values is performed at respective predetermined intervals during the growing season.

In one embodiment, the method further comprises: responsive to the actual plot-specific RSP values and the forecast ET0, generating a second ETc curve; responsive to the forecast global RSP values and the forecast ET0, generating a third ETc curve; and responsive to the forecast plot-specific RSP values and the forecast ET0, generating a fourth ETc curve, wherein the generation of the first ETc curve is responsive to the second, third and fourth ETc curves.

In another embodiment, the method further comprises: determining a respective difference between a historical ETc curve associated with the field-plot and historical curves of the second, third and fourth ETc curves; and responsive to the determined differences, determining a respective weight for each of the second, third and fourth ETc curves, wherein the generation of the first ETc curve is further responsive to the respective weights for each of the second, third and fourth ETc curves.

In one embodiment, the method further comprises: receiving values of past/present GIVs; applying the global RSP model to the received values of the past/present GIVs and, responsive to the applied global RSP model, determining seasonal global RSP values; receiving values of past/present PSIVs associated with the field plot; applying the plot-specific RSP model to the received values of the past/present PSIVs and, responsive to the applied plot-specific RSP model, determining seasonal plot-specific RSP values; receiving a value associated with a historical ET0 associated with the field plot; and receiving a crop coefficient (Kc) associated with the field plot, wherein, responsive to the seasonal global RSP values, the seasonal plot-specific RSP values, the historical ET0 value and the Kc, the method further comprises: generating a fifth ETc curve; and responsive to the determined fifth ETc curve and the generated first ETc curve, generating a sixth ETc curve, the determination of the growing season water amount for the field plot responsive to the generated sixth ETc curve. In another embodiment, the method further comprises performing a summation of the sixth ETc curve, the determination of the growing season water amount for the field plot responsive to an outcome of the summation of the sixth ETc curve.

In one embodiment, the method further comprises: responsive to the historical ET0 value and the Kc, generating a seventh ETc curve; responsive to the seasonal global RSP values and the historical ET0 value, generating an eighth ETc curve; and responsive to the seasonal plot-specific RSP values and the historical ET0 value, generating a ninth ETc curve, wherein the generation of the fifth ETc curve is responsive to the seventh, eighth and ninth ETc curves.

In another embodiment, the method further comprises: determining a respective difference between a historical ETc curve associated with the field-plot and historical curves of each of the seventh, eighth and ninth ETc curves; and responsive to the determined differences, determining a respective weight for each of the seventh, eighth and ninth ETc curves, wherein the generation of the fifth ETc curve is further responsive to the respective weights for each of the seventh, eighth and ninth ETc curves.

In one embodiment, the method further comprises: responsive to the first ETc curve and the fifth ETc curve, determining one or more regression functions defining a relationship between the first ETc curve and the fifth ETc curve; and comparing a regression metric of the determined one or more regression functions to a predetermined threshold, wherein, responsive to an outcome of the comparison indicating that the regression metric is greater than the predetermined threshold, the sixth ETc curve is a product of the fifth ETc curve and regression coefficients of the predetermined regression function, and wherein, responsive to the outcome of the comparison indicating that the regression metric is not greater than the predetermined threshold, the sixth ETc curve is a respective predetermined function of the first ETc curve, the eight ETc curve and the ninth ETc curve. In another embodiment, the sixth ETc curve is a respective predetermined function of the first and fifth ETc curves.

In one embodiment, the method further comprises: receiving actual global RSP values; applying a first plot water stress (PWS) model to the received actual global RSP values measured plot-specific RSP values and, responsive to the applied first PWS model, determining a first set of PWS coefficient values for global plots; responsive to the generated eighth ETc curve, defining a plurality of periods within the growing season associated with growth phases of the crop; applying a second PWS model to the determined first set of PWS coefficient values and, responsive to the applied second PWS model, determining a past/present PWS curve for a crop of the field plot for each of the plurality of periods; receiving flux data and/or thermal measurements of the global plots; applying a third PWS model to the received flux data and/or thermal measurements; responsive to the applied third PWS model, determining a second set of PWS coefficient values for the field plot, the second set of PWS coefficient values for the field plot input into the second PWS model such that the determined past/present PWS curve is responsive to the second set of PWS coefficient values; applying a fourth PWS model to the receive flux data and/or thermal measurements; responsive to the applied fourth PWS model, determining a PWS reduction rate;

responsive to the determined PWS reduction rate and the past/present PWS curve, determining forecast PWS values for the field plot; and responsive to the determined past/present PWS curve, the determined forecast PWS values and the first ETc curve, generating a tenth ETc curve, wherein the determination of the next irrigation water amount for the field plot is responsive to the generated tenth ETc curve.

In one embodiment, the first set of PWS coefficient values comprises a plurality of subsets of PWS coefficient values, each of the plurality of subsets associated with a respective one of a plurality of portions of the field plot, wherein the method further comprises applying a fifth PWS model to the first set of PWS coefficient values and, responsive to the applied fifth PWS model, determining a respective optimal PWS curves for each of the plurality of portions of the field plot for each of the plurality of periods, and wherein the generation of the tenth ETc curve is further responsive to the respective optimal PWS curves for each of the plurality of portions of the field plot. In another embodiment, the method further comprises, responsive to the forecast PWS values for the field plot, determining an optimal date for the next irrigation of the field plot.

Independently, a system for managing irrigation of a crop in a field plot for a growing season is provided, the system comprising: one or more processors; a communication unit; and a memory, the memory having a plurality of instructions stored thereon, the plurality of instructions arranged, when executed by the one or more processors, to cause the one or more processors to: responsive to the communication unit, receive values of one or more forecast global independent variables (GIVs); apply a global remote sensing product (RSP) model to the received values of the forecast GIVs and, responsive to the applied global RSP model, determine forecast global RSP values; responsive to the communication unit, receive values of forecast plot-specific independent variables (PSIVs) associated with the field plot; applying a plot-specific RSP model to the received values of the forecast PSIVs and, responsive to the applied plot-specific RSP model, determining forecast plot-specific RSP values; responsive to the communication unit, receive a forecasted reference evapotranspiration (ET0) associated with the field plot; and responsive to the communication unit, receive one or more actual plot-specific RSP values associated with the field plot, wherein, responsive to the forecast global RSP values, the forecast plot-specific RSP values, the forecast ET0 and the actual plot-specific RSP values, the plurality of instructions are further arranged to cause the one or more processors to: generate a first crop evapotranspiration (ETc) curve; responsive to the generated first ETc curve, determine a growing season water amount for the field plot and/or determine a next irrigation water amount for the field plot; and output, via the communication unit, to a device the determined growing season water amount and/or the determined next irrigation water amount such that irrigation of the field plot can be adjusted.

In one embodiment, the global RSP model comprises a plurality of sub-models, each of the plurality of sub-models associated with a respective global attribute. In another embodiment, the receipt of values of forecast GIVs is performed at respective predetermined intervals during the growing season, wherein the receipt of values of forecast PSIVs is performed at respective predetermined intervals during the growing season, and wherein the receipt of actual plot-specific RSP values is performed at respective predetermined intervals during the growing season.

In one embodiment, the plurality of instructions are further arranged to cause the one or more processors to: responsive to the actual plot-specific RSP values and the forecast ET0, generate a second ETc curve; responsive to the forecast global RSP values and the forecast ET0, generate a third ETc curve; and responsive to the forecast plot-specific RSP values and the forecast ET0, generate a fourth ETc curve, wherein the generation of the first ETc curve is responsive to the second, third and fourth ETc curves.

In another embodiment, the plurality of instructions are further arranged to cause the one or more processors to: determine a respective difference between a historical ETc curve associated with the field-plot and historical curves of the second, third and fourth ETc curves; and responsive to the determined differences, determine a respective weight for each of the second, third and fourth ETc curves, wherein the generation of the first ETc curve is further responsive to the respective weights for each of the second, third and fourth ETc curves.

In one embodiment, the plurality of instructions are further arranged to cause the one or more processors to: responsive to the communication unit, receive values of past/present GIVs; apply the global RSP model to the received values of the past/present GIVs and, responsive to the applied global RSP model, determine seasonal global RSP values; responsive to the communication unit, receive values of past/present PSIVs associated with the field plot; apply the plot-specific RSP model to the received values of the past/present PSIVs and, responsive to the applied plot-specific RSP model, determine seasonal plot-specific RSP values; responsive to the communication unit, receive a value associated with a historical ET0 associated with the field plot; and responsive to the communication unit, receive a crop coefficient (Kc) associated with the field plot, and wherein, responsive to the seasonal global RSP values, the seasonal plot-specific RSP values, the historical ET0 value and the Kc, the plurality of instructions are further arranged to cause the one or more processors to: generate a fifth ETc curve; and responsive to the determined fifth ETc curve and the generated first ETc curve, generate a sixth ETc curve, the determination of the growing season water amount for the field plot responsive to the generated sixth ETc curve.

In another embodiment, the plurality of instructions are further arranged to cause the one or more processors to perform a summation of the sixth ETc curve, the determination of the growing season water amount for the field plot responsive to an outcome of the summation of the sixth ETc curve.

In one embodiment, the plurality of instructions are further arranged to cause the one or more processors to: responsive to the historical ET0 value and the Kc, generate a seventh ETc curve; responsive to the seasonal global RSP values and the historical ET0 value, generate an eighth ETc curve; and responsive to the seasonal plot-specific RSP values and the historical ET0 value, generate a ninth ETc curve, wherein the generation of the fifth ETc curve is responsive to the seventh, eighth and ninth ETc curves.

In another embodiment, the plurality of instructions are further arranged to cause the one or more processors to: determine a respective difference between a historical ETc curve associated with the field-plot and historical curves of each of the seventh, eighth and ninth ETc curves; and responsive to the determined differences, determine a respective weight for each of the seventh, eighth and ninth ETc curves, wherein the generation of the fifth ETc curve is further responsive to the respective weights for each of the seventh, eighth and ninth ETc curves.

In one embodiment, the plurality of instructions are further arranged to cause the one or more processors to:

responsive to the first ETc curve and the fifth ETc curve, determine one or more regression functions defining a relationship between the first ETc curve and the fifth ETc curve; and compare a regression metric of the determined one or more regression functions to a predetermined threshold, wherein, responsive to an outcome of the comparison indicating that the regression metric is greater than the predetermined threshold, the sixth ETc curve is a product of the fifth ETc curve and regression coefficients of the predetermined regression function, and wherein, responsive to the outcome of the comparison indicating that the regression metric is not greater than the predetermined threshold, the sixth ETc curve is a respective predetermined function of the first ETc curve, the eight ETc curve and the ninth ETc curve. In another embodiment, the sixth ETc curve is a respective predetermined function of the first and fifth ETc curves.

In one embodiment, the plurality of instructions are further arranged to cause the one or more processors to: responsive to the communication unit, receive actual global RSP values; apply a first plot water stress (PWS) model to the received actual global RSP values measured plot-specific RSP values and, responsive to the applied first PWS model, determine a first set of PWS coefficient values for global plots; responsive to the generated eighth ETc curve, define a plurality of periods within the growing season associated with growth phases of the crop; apply a second PWS model to the determined first set of PWS coefficient values and, responsive to the applied second PWS model, determine a past/present PWS curve for a crop of the field plot for each of the plurality of periods; responsive to the communication unit, receive flux data and/or thermal measurements of the global plots; apply a third PWS model to the received flux data and/or thermal measurements; responsive to the applied third PWS model, determine a second set of PWS coefficient values for the field plot, the second set of PWS coefficient values for the field plot input into the second PWS model such that the determined past/present PWS curve is responsive to the second set of PWS coefficient values; apply a fourth PWS model to the receive flux data and/or thermal measurements; responsive to the applied fourth PWS model, determine a PWS reduction rate; responsive to the determined PWS reduction rate and the past/present PWS curve, determine forecast PWS values for the field plot; and responsive to the determined past/present PWS curve, the determined forecast PWS values and the first ETc curve, generate a tenth ETc curve, wherein the determination of the next irrigation water amount for the field plot is responsive to the generated tenth ETc curve.

In another embodiment, the first set of PWS coefficient values comprises a plurality of subsets of PWS coefficient values, each of the plurality of subsets associated with a respective one of a plurality of portions of the field plot, wherein the plurality of instructions are further arranged to cause the one or more processors to apply a fifth PWS model to the first set of PWS coefficient values and, responsive to the applied fifth PWS model, determining a respective optimal PWS curves for each of the plurality of portions of the field plot for each of the plurality of periods, and wherein the generation of the tenth ETc curve is further responsive to the respective optimal PWS curves for each of the plurality of portions of the field plot.

In one embodiment, the plurality of instructions are further arranged to cause the one or more processors to, responsive to the forecast PWS values for the field plot, determine an optimal date for the next irrigation of the field plot.

Additional features and advantages of the invention will become apparent from the following drawings and description.

Unless otherwise defined, all technical and scientific terms used herein have the same meaning as commonly understood by one of ordinary skill in the art to which this invention pertains. In case of conflict, the patent specification, including definitions, governs. As used herein, the articles "a" and "an" mean "at least one" or "one or more" unless the context clearly dictates otherwise. As utilized herein, "and/or" means any one or more of the items in the list joined by "and/or". As an example, "x and/or y" means any element of the three-element set $\{(x), (y), (x, y)\}$. In other words, "x and/or y" means "x, y or both of x and y". As another example, "x, y, and/or z" means any element of the seven-element set $\{(x), (y), (z), (x, y), (x, z), (y, z), (x, y, z)\}$.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

As used herein, the term "about", when referring to a measurable value such as an amount, a temporal duration, and the like, is meant to encompass variations of +/−10%, more preferably +/−5%, even more preferably +/−1%, and still more preferably +/−0.1% from the specified value, as such variations are appropriate to perform the disclosed devices and/or methods.

The following embodiments and aspects thereof are described and illustrated in conjunction with systems, tools and methods which are meant to be exemplary and illustrative, but not limiting in scope. In various embodiments, one or more of the above-described problems have been reduced or eliminated, while other embodiments are directed to other advantages or improvements.

BRIEF DESCRIPTION OF DRAWINGS

For a better understanding of the invention and to show how the same may be carried into effect, reference will now be made, purely by way of example, to the accompanying drawings in which like numerals designate corresponding sections or elements throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how several forms of the invention may be embodied in practice. In the accompanying drawings:

FIGS. 3a-3b illustrate an overview of a system for managing irrigation of a field plot for a growing season, in accordance with some embodiments;

DETAILED DESCRIPTION OF CERTAIN EMBODIMENTS

Figure 1A:
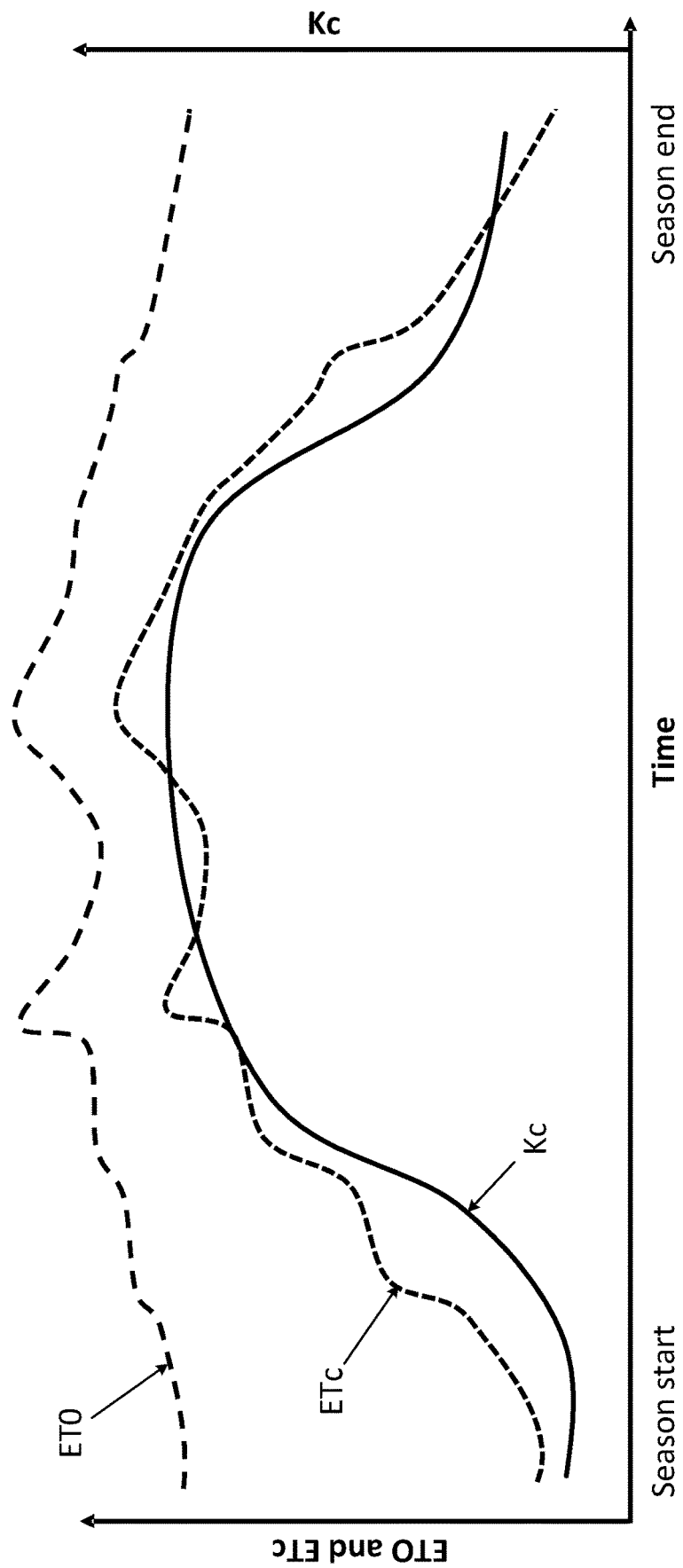
FIGS. 1a-1b illustrate exemplary graphs of ET0, ETc, PWS and Kc curves.
Figure 1B:
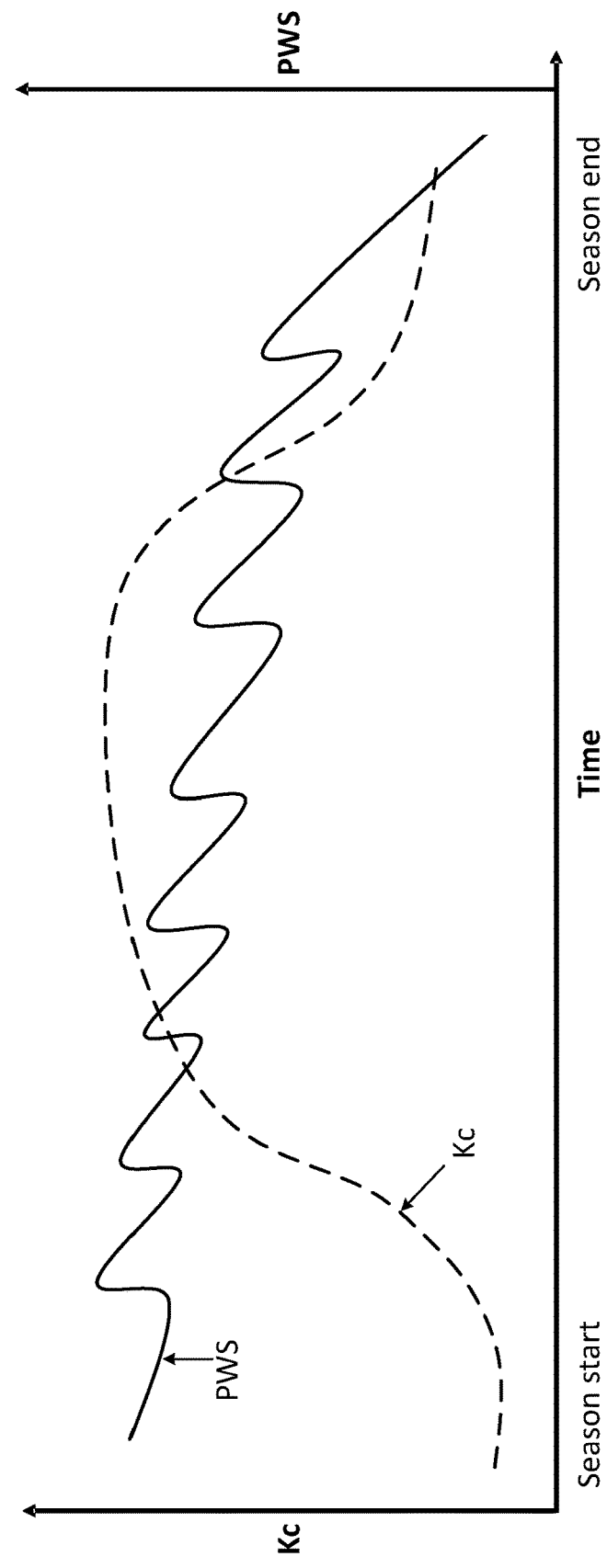

In the following description, various aspects of the disclosure will be described. For the purpose of explanation, specific configurations and details are set forth in order to provide a thorough understanding of the different aspects of the disclosure. However, it will also be apparent to one skilled in the art that the disclosure may be practiced without specific details being presented herein. Furthermore, well-known features may be omitted or simplified in order not to obscure the disclosure. In the figures, like reference numerals refer to like parts throughout. In order to avoid undue clutter from having too many reference numbers and lead lines on a particular drawing, some components will be introduced via one or more drawings and not explicitly identified in every subsequent drawing that contains that component.

The term "FAO56" used herein refers to the publication of The Food and Agriculture Organization of the United Nations, Irrigation and Drainage Paper No. 56 (Allen R. E. et al, FAO, 1998).

The term "growth period" used herein refers to the "crop growth period", which means each of a series of phenological stages in crop development. This period can range from a day to dozens of weeks. The growth periods can be determined by, but not limited to, local or global protocols, expert knowledge, Kc curves, and others.

The term "ETc" used herein means "crop evapotranspiration" under standard conditions as mentioned in the FAO56 and refers to crops grown under excellent agronomic and soil water conditions.

The term "ET0" used herein means "reference evapotranspiration" and refers to the estimation of the evapotranspiration from the reference surface as defined in chapter 1 in the FAO56. ET0 used herein can be calculated using the Penman-Monteith method (Allen R. E. et al, FAO-56, 1998), the HS method (Hargreaves, G. H. and Samani, Z. A., 1985, Applied Engineering in Agriculture 1, 96-99), measurements by meteorological stations, or any other option, as known to those skilled in the art.

The term "Kc" as used herein refers to a "crop coefficient" that varies by crop and growth stage as defined in the FAO56. More specifically, Kc herein refers to local or global non-stress protocols.

The term "PWS" as used herein refers to a "plot water stress coefficient" that indicates the reduction rate in the crop usage of supplied water.

The term "PWS_max" used herein refers to non-stress conditions and equal to 1.0.

The term "PWS_min" used herein refers to plot water stress value for non-transpiring vegetation, with a value that aspires to 0.0.

The term "PWS_high" used herein refers to the value for stressed crops on full maximum transpiration status relative to the crop conditions (usually after wetting events), with a value approaching 1.0.

The term "PWS_opt" used herein refers to the "optimal plot stress coefficient", which means the best value of PWS to achieve optimum WUE, i.e., PWS value at which irrigation should be applied. This value should be measured or estimated just before the next wetting events. From an agronomic point of view, this is the lowest value of PWS under which the crop's growth is still optimal.

The term "WUE" used herein refers to "water use efficiency", which means the ratio of yield to water supplied.

The term "RSP" as used herein refers to "remote sensing products" and relates to any product resulted from a remote sensing instrument such as but not limited to, sensors or cameras mounted on a device inside or nearby the crop field (e.g., a pole, a tower) or onboard drones, airplanes or satellites, and can collect any portion of the electromagnetic spectrum such as but not limited to, optic (400-2500 nm), thermal (3000-14000 nm), or synthetic aperture radar (SAR) (3-25 cm). The product of remote sensing can be, but not limited to, spectral bands, spectral indices, band transformations, thermal maps, radar backscattering, or any combination of these options. In one embodiment, RSP values can be calculated from historic as well as real-time remote sensing imagery, or it can be estimated and/or forecasted for the past, present, and future using different models, as will be described below.

The term "Kv" as used herein refers to Kc calculated from RSP values.

The term "Model" used herein refers to a mathematical model that embodies a set of statistical assumptions regarding the generation of sample data. It represents the relationship between one or more independent variables and other dependent variables such as the dependent variable equaling a function of the independent variable. The Model used herein can be, but not limited to, artificial intelligence (AI) models as the neural networks family or random forest and its derivatives, time-series models such as Autoregressive Integrated Moving Average (ARIMA) or Seasonal Autoregressive Integrated Moving Average (SARIMA) or other statistical and mathematical methods such as Kalman filters.

The term "DB" used herein means "database" and refers to a structured set of data held in a computer and accessible in various ways. Furthermore, the term DB herein refers to DB that is constantly being updated and holds various historic information for many sites around the world and used to train the Models.

The term "SA" used herein means "statistical aggregation". It refers to methods that take a series of data and summarize it based on a statistical or mathematical method as, but not limited to, the mean, the median, or a weighted moving average.

The term "GIV" used herein refers to "global independent variables" which mean variables obtained from many plots around the world such as but not limited to, weather parameters (e.g., temperature, relative humidity, wind speed), plot features (e.g., country, elevation, irrigation method), soil properties (e.g., sand, silt, and clay), partially, all, or more. Plot features include, without limitation, geographic location, irrigation efficiency, irrigation type, crop type, elevation, the day of the season start, and soil type.

The term "PSIV" used herein refers to "plot-specific independent variables", which means variables obtained from the history of one specific plot around the world such as but not limited to weather parameters (e.g., temperature, relative humidity, wind speed), plot features (e.g., geographic location, elevation, irrigation method), soil properties (e.g., sand, silt, and clay) partially, all, or more.

The term "TSA" used herein refers to "time series analysis", which means methods to statistically analyze a set of data-points which are time-dependent, and comprise seasonality and cyclic variations, long term trends, and irregular movements.

The term "QA" used herein refers to "quality assurance", which specifically means herein data quality assurance. Data quality assurance is the process of data profiling to discover inconsistencies and other anomalies in the data, as well as performing data cleansing activities (e.g. removing outliers, missing data interpolation) to improve the data quality.

The terms "plot", "field" and "field plot" are used herein interchangeably and refer to an agriculture field, an area of land, enclosed or otherwise, used for agricultural purposes such as cultivating crops and geographically defined by sets of coordinates.

The term "GDD" used herein refers to "growing-degree-days", which is a heuristic tool in phenology based on heat accumulation, as known to those skilled in the art.

The term "wetting events" used herein refers to events by which the plot soil and vegetations are being wetted by water, such as in the case of irrigation and/or rain.

The term "receive", as used herein, is not meant to be limited to receiving from an external system or a user input device, and is meant to particularly include the outcome of calculations performed by one or more dedicated functions. Similarly, the term "receive responsive to the communication unit", as used herein, is not limited to an embodiment where the desired data is received via the communication unit, and is specifically meant to include embodiments where other data, or measurements, are received via the communication unit, and the desired data is estimated or calculated from the data/measurements received via the communication unit.

As will be described below, the present disclosure advantageously provides systems and methods that can estimate three important parameters in irrigation, namely: the amount of water needed for the entire growing season; the amount of water for the next irrigation; and the recommended date for next irrigation. All ETc curves are based on the equation defined in the FAO56 for non-stress conditions:

$$ETc = ET0 * Kc \qquad \text{EQ. 1}$$

In one embodiment, ET0 is derived from past, present, or future weather measurements or estimations. In another embodiment, Kc is derived from global or local protocols, as well as from published literature, or statistical or mathematical models. In another embodiment, PWS values are calculated or obtained from, but not limited to, scientific devices that water stress can be derived from, such as flux towers or chambers or pressure bombs, published literature, or statistical or mathematical models. In one embodiment, ETc, ET0, Kc, and PWS are estimated or forecasted daily for past, present, or future periods. These daily changes allow the system to determine the above described three outputs, i.e. the optimum date and the water amount of the next irrigation, and the total water amount for the entire growing season. As will be described below, it is not necessary that the system output all 3 outputs, and in one embodiment the system outputs 1 or 2 of the 3 outputs.

Figure 3B:
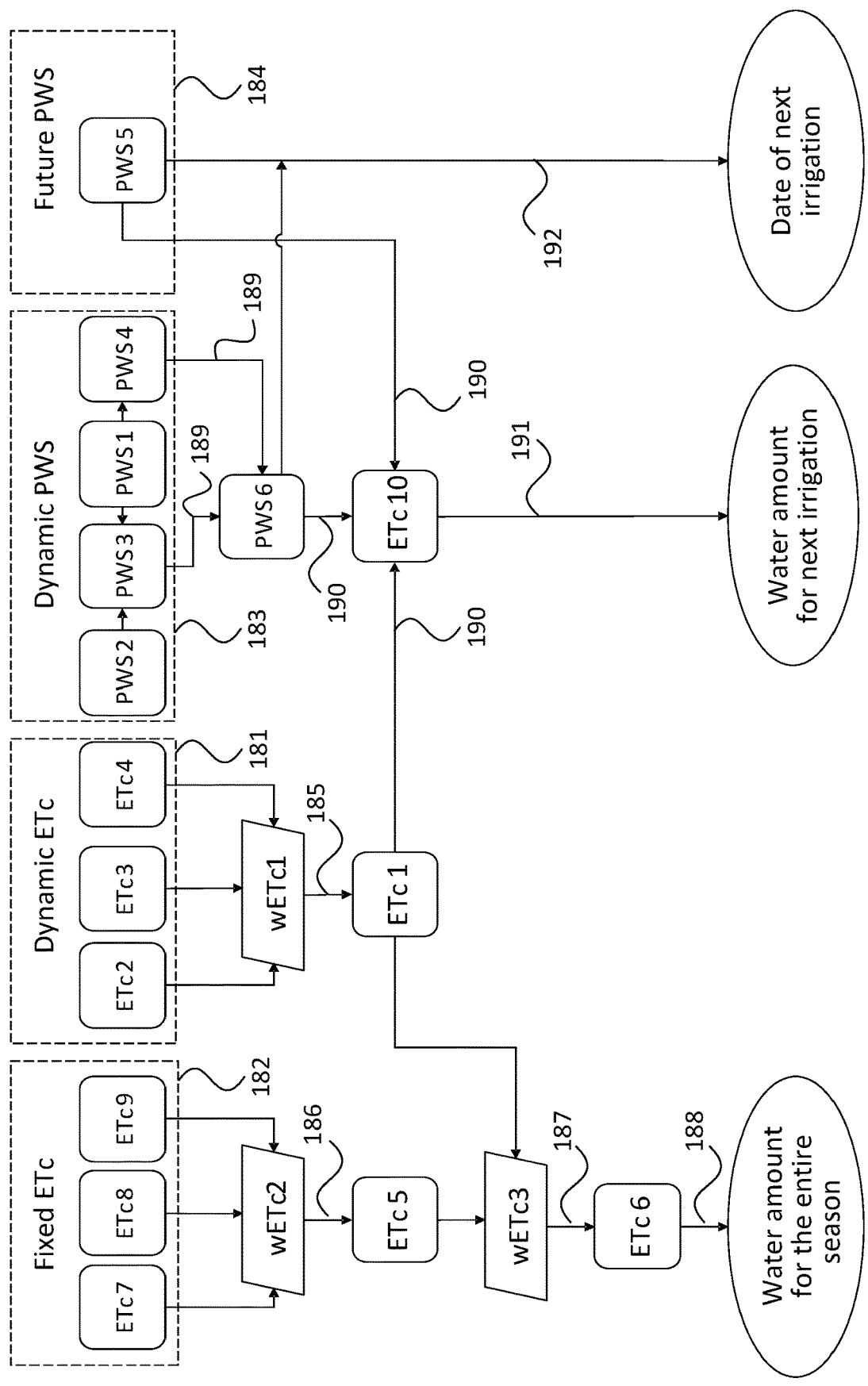

FIGS. 3a-3b illustrate an overview of a system 100 for managing irrigation of a field plot for a growing season. As illustrated in FIG. 3a, in one embodiment system 100 comprises: one or more processors 110; a memory 120; and a communication unit 130. In one embodiment, system 100 is implemented within a dedicated server. In another embodiment, system 100 is implemented via cloud computing. In one embodiment, communication unit 130 comprises a network connection, including, but not limited to, an internet connection. In another embodiment, communication unit 130 comprises a cellular network connector/antenna. In another embodiment, communication unit 130 comprises any suitable communications connector and is operated under any suitable communications protocol. In one embodiment, communication unit 130 comprises a user input device. In one embodiment, communication unit 130 is in communication with one or more RSP sources, such as satellites 140. In another embodiment, communication unit 130 is in communication with one or more weather forecast and/or history sources 150. Communication unit 130 is in communication with a plurality of user devices, such as user device 160. In one embodiment, user device 160 controls an irrigation system 170 of a field plot.

Although processors 110, memory 120 and communication unit 130 are illustrated as being in a single computing environment, this is not meant to be limiting in any way. In another embodiment, system 100 performs certain functions, and/or stores certain data on user devices 160. In one embodiment, as will be described below, memory 120 has stored thereon a plurality of databases. In another embodiment, memory 120 has stored thereon a plurality of instructions, the plurality of stored instruction arranged, when executed by one or more processors 110, to cause one or more processors 110 to perform certain methods, as will be described below.

As will described below, system 100 provides management of crop irrigation, per plot. In one embodiment, this performed using ensemble learning. In another embodiment, system 100 outputs information regarding three factors representing different components of crop water needs decision making: the necessary water amount for the entire growing season; the water amount for the next irrigation; and the next irrigation date. System 100 comprises a plurality of models that are strategically generated and combined to produce the specified outcomes. In one embodiment, the training of these models is ongoing. Therefore, the models are updating, learning, and improving with time. In another embodiment, at the end of each plot growing season, all the data collected from the plot growing season is fed back to system 100 after quality assurance (QA) tests, and new calculations update the models' coefficients for the next growing season.

FIG. 3b shows a general schema of the operation of system 100. As will be described below, system 100 generates several ETc and PWS curves that are obtained from various data sources and methods. By using the different ETc and PWS, the above decision-making components can be achieved. The ETc and PWS are grouped into four main blocks according to their similarities and functionality in this invention, particularly a dynamic ETc block 181, a fixed ETc block 182, a dynamic PWS block 183 and a future PWS block 184.

As shown in FIG. 3b, dynamic ETc block 181 is used for generating a first ETc curve, denoted ETc1. Particularly, in one embodiment, as will be described below, dynamic ETc block 181 generates: a second ETc curve, denoted ETc2; a third ETc curve, denoted ETc3; and a fourth ETc curve, denoted ETc4. In step 185, a respective weighted function, denoted wETc1, is applied to the generated ETc2, ETc3 and ETc4. An outcome of the applied function wETc1 is equal to ETc1.

Fixed ETc block 182 is used for generating a fifth ETc curve, denoted ETc5. Additionally, a sixth ETc curve, denoted ETc6, is generated responsive to ETc5 and ETc1. Particularly, in one embodiment, as will be described below, fixed ETc block 182 generates: a seventh ETc curve, denoted ETc7; an eighth ETc curve, denoted ETc8; and a ninth ETc curve, denoted ETc9. In step 185, a respective weighted function, denoted wETc2, is applied to the generated ETc7, ETc8 and ETc9. An outcome of the applied function wETc2 is equal to ETc5. In step 187, a respective weighted function, denoted wETc3, is applied to ETc5 and ETc1. An outcome of the applied function wETc3 is equal to ETc6. In step 188, system 100 determines from ETc6 a necessary water amount for the entire growing season.

Dynamic PWS block 183 generates a plurality of PWS datasets and curves, denoted PWS1, PWS2, PWS3 and PWS4. Similarly, future PWS block 184 determines a forecast PWS value, denoted PWS5. In step 189, as will be described below, PWS1, PWS2, PWS3 and PWS4 are used to determine an additional PWS dataset, denoted PWS6. In step 190, responsive to PWS5, PWS6 and ETc1, a tenth ETc curve is generated, the tenth ETc curve denoted ETc10. In step 191, system 100 determines from ETc10 the amount of water to be used for the next irrigation event. In step 192, system 100 determines from PWS5 the optimal date (and/or time) for the next irrigation event.

As will be described below, system 100 does not have to determine all of the above described data, nor does it have to output all 3 outputs, i.e. water amount for the entire growing season, water amount for the next irrigation and the date of the next irrigation.

Figure 4:
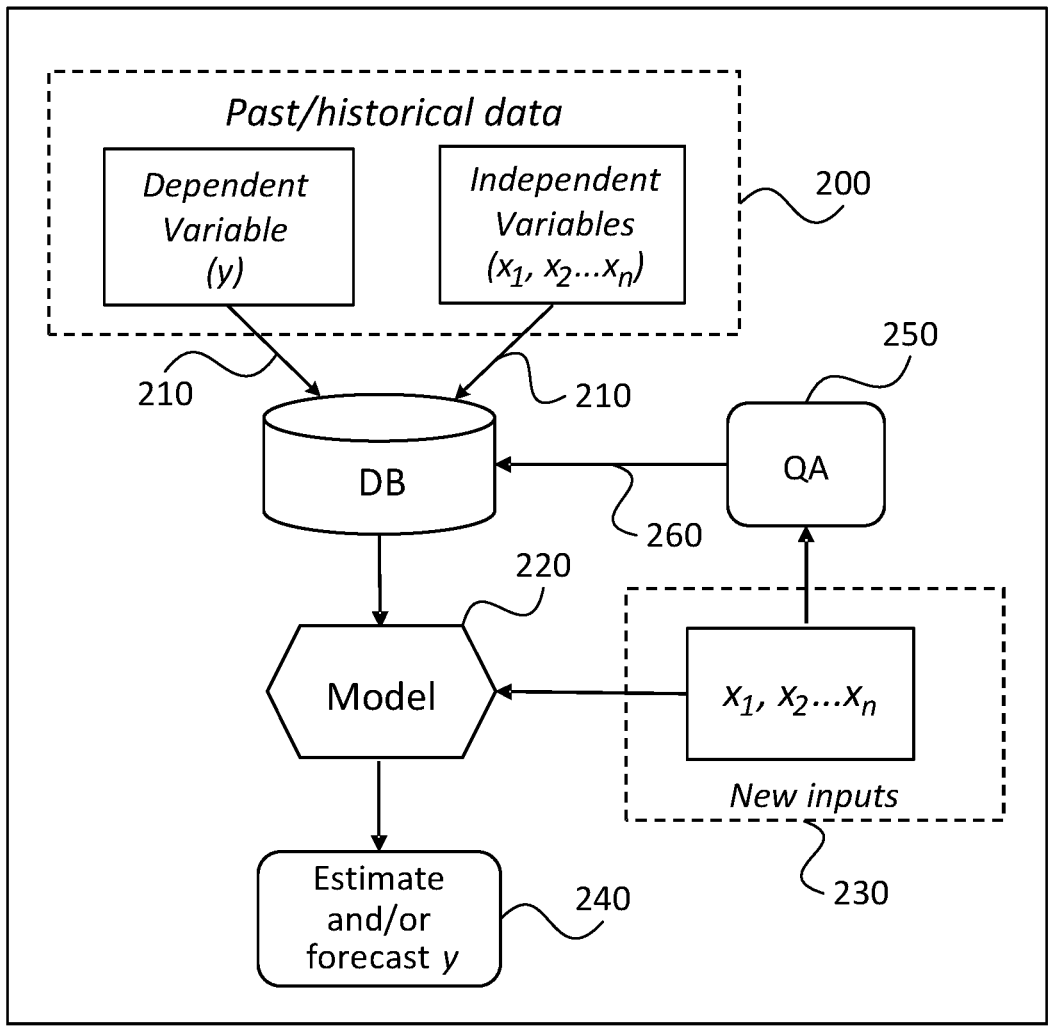
FIG. 4 illustrates a high-level schema of training and validating models of the system of FIGS. 3a-3b, in accordance with some embodiments.

As will be described below, a plurality of models are employed to produce the estimated (past and present) and forecasted (future) ETc and PWS datasets. FIG. 4 illustrates a high-level schema of the use of such models. In step 200, relevant data is collected for dependent (y) and independent variables (x1, x2 ... xn). In step 210, these values are stored in a database (DB). In step 220, the model learns the relationship between the dependent variable and the independent variables. In other words, the dependent variable is a function of the independent variables and the model learns what that function is. Although a plurality of independent variables are shown, this is not meant to be limiting in any way, and a single independent variable can be used for training each model. In one embodiment, steps 200-220 occur before model usage in real-time.

Once a model is established, in step 230 new values of independent variable/s are input into the model, and in step 240 the model performs estimations (past and present) and/or forecasts (future) of the dependent variable given the new values of the independent variables. In one embodiment, in step 260 these new values as input are also used to enrich the DB and update the model coefficients and parameters such that the model keeps improving and training on the most up-to-date data. In one further embodiment, in step 250, one or more QA tests are applied to the new values to determine their viability for training the model. In such an embodiment, updating the model using the new values is performed only if they pass the QA tests, as described above.

Figure 5A:
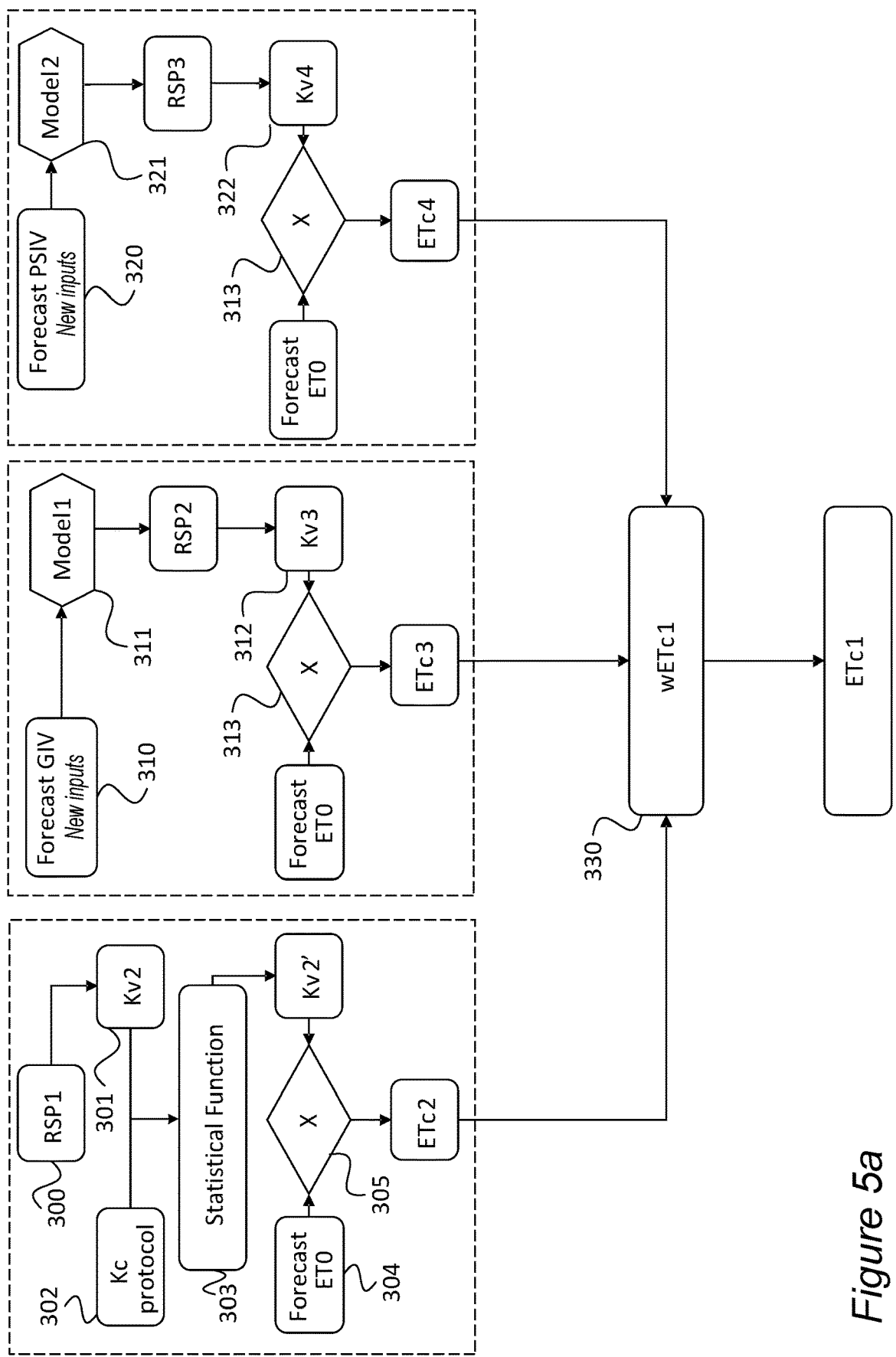
FIGS. 5a-5b illustrate high-level flow diagrams of various methods of generating a respective ETc curve, in accordance with some embodiments.

FIG. 5a illustrates a high-level flow diagram of a method of generating the curve of ETc1 by system 100, in accordance with some embodiments. In one embodiment, as described above, the method is performed by one or more processors 110 reading respective instructions stored in memory 120.

In step 300, one or more actual plot-specific RSP values associated with the field plot are received, the RSP values denoted RSP1. The term "plot-specific RSP values", as used herein, means RSP values associated with the present plot. The term "actual plot-specific RSP values", as used herein, means: plot-specific RSP values which are received from an external source, such as measured plot-specific RSP values; and/or calculated and/or estimated plot-specific RSP values, determined based on received measurement data, such as spectral indices. In one embodiment, RSP1 is received from an external system. In another embodiment, system 100 receives images and/or readings from one or more remote sensing sources. In such an embodiment, processor 110 analyzes the received images/readings and determines relevant RSP values therefrom, as known to those skilled in the art.

In step 301, a respective crop coefficient Kv2 is determined from RSP1, as known to those skilled in the art. In step 303, future Kv values are determined from Kv2, the future Kv values denoted Kv2'. In one embodiment, Kv2' is determined by a applying one or more statistical functions to Kv2. In one further embodiment, in step 302, a Kc protocol (either global or local) is received, and Kv2' is determined responsive to the received Kc protocol, as described in International (PCT) Patent Application Publication WO 2019198072, the entire contents of which incorporated herein by reference. In another further embodiment, Kv2' is determined by calculating an average or median of Kv2.

In step 304, a forecasted ET0 is received. In one embodiment, forecasted ET0 is received from an external meteorological service via communication unit 130. In another embodiment, a forecasted ET0 for each of a plurality of plots, or plot types, is received. In step 305, responsive to the received forecasted ET0 associated with the present plot and responsive to Kv2', a curve of ETc2 is generated. The term "curve", as used herein, means a discreet dataset of values over a predetermined period of time. In one embodiment, ETc2 is equal to a multiplication of the forecasted ET0 and Kv2'. ETc2 is thus updated each time a new RSP1 is received.

In step 310, one or more forecast values of one or more forecast GIVs are received. In one embodiment, the forecast GIV values are received from one or more external sources via communication unit 130. In another embodiment, various forecast data is received from one or more external sources, via communication unit 130, and processor 110 calculates or estimates one or more values of one or more forecast GIVs responsive to the received data.

In step 311, a global RSP model, denoted model1, is applied the forecast GIV value/s. Model1 follows the general schema described above in relation to FIG. 4. The DB, or DBs, used to train model1 contain one or more GIVs as the independent variable, while the dependent variables are RSP values from different plots. In one embodiment, RSP values are from plots in different parts of the world. In another embodiment, each DB of model1 corresponds to a group of plots that are spatially homogenous and/or crop-type homogenous. For example, there can be a DB for all crops from a certain country or a certain region, or DB for all tomato plots around the world, or DB for tall crops. Thus, model1 is not limited to only one model and can have many sub-models, such as sub-model1 for tomato plots around the globe and/or sub-model1 for all crops in Italy. During training, model1 will take new inputs that will include statistically aggregated weather data and plot properties, per plot.

In one embodiment, weather data, for all models, include, without limitation, reference evapotranspiration (ET0) models such as Penman-Monteith or Hargreaves-Samani, solar radiation, sunshine hours, temperature, rain, relative humidity, wind speed, VPD and any statistical or mathematical aggregation thereof. Weather features can be measured from meteorological stations, estimated, and/or forecasted by a model, or calculated and/or aggregated from past meteorological data.

The output of model1 will then be RSP values. Since the input GIV values are forecast values, the output values of RSP will be forecast RSP values. Thus, in an embodiment where ETc1 is being determined at the beginning of the growing season, or before the growing season, the output values of RSP will be forecast RSP values for the whole season.

In step 312, the output RSP values, denoted RSP2, are converted to a crop coefficient value, denoted Kv3, as previously mentioned (e.g., by methods suggested by Tasumi, M. et al., 2006, U.S. Committee on Irrigation and Drainage, 103-112; Nagler, P. L et al., 2013, Remote Sensing 5, 3849-3871). Since the received GIVs represent different types of plots, in one embodiment Kv3 is determined per plot type. In step 313, a curve of ETc3 is generated responsive to the received forecast ET0 of step 304 and Kv3. In one embodiment, ETc3 values are determined responsive to the forecast ET0 and Kv3 associated with the present plot. In another embodiment, the ETc3 curve is generated by multiplying the forecast ET0 with Kv3. Since forecasted inputs such as weather, can be computed daily, or even hourly, ETc3 is in one embodiment also updated daily, or hourly, to the extent of the corresponding forecast. Therefore, ETc3 can provide daily, or hourly, forecast values for each plot type of model1.

In step 320, one or more forecast values of one or more forecast PSIVs are received. In one embodiment, the forecast PSIV values are received from one or more external sources via communication unit 130. In another embodiment, various forecast data is received from one or more external sources, via communication unit 130, and processor 110 calculates or estimates one or more values of one or more forecast PSIVs responsive to the received data.

In step 321, a plot-specific RSP model, denoted model2, is applied the forecast PSIV value/s. Model2 follows the general schema described above in relation to FIG. 4. The DB, or DBs, used to train model2 contain one or more PSIVs as the independent variable, while the dependent variables are RSP values from the specific plot history. Thus, each plot will have its own respective model2 stored in memory 120 of system 100, the respective model2 of each plot being trained only with the information associated with the respective plot. During training, model2 will take new inputs that will include statistically aggregated weather data and plot properties, associated with the respective plot. The output of model2 will then be RSP values. Since the input PSIV values are forecast values, the output RSP values will be forecast RSP values for the respective plot.

In step 322, the output RSP values, denoted RSP3, are converted to a crop coefficient value, denoted Kv4, as described above. In step 323, a curve of ETc4 is generated responsive to the received forecast ET0 of step 304 and Kv4. In one embodiment, the ETc4 curve is generated by multiplying the forecast ET0 with Kv4. Since forecasted inputs such as weather, can be computed daily, or even hourly, ETc4 is in one embodiment also updated daily, or hourly, to the extent of the corresponding forecast. Therefore, ETc4 can provide daily, or hourly, forecast values for the respective plot, or any plot having an associated model2.

Figure 5B:
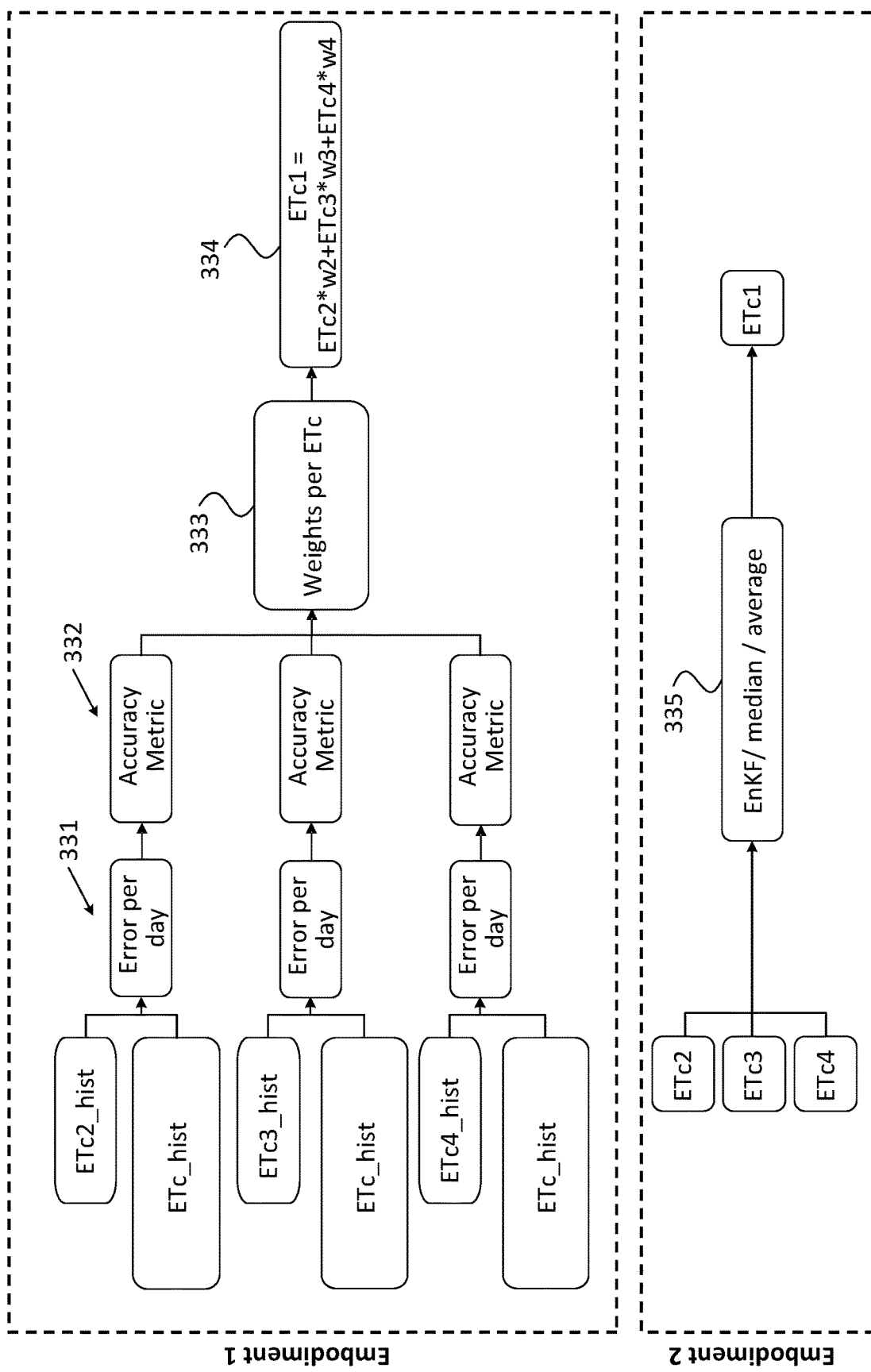

Once the ETc2, ETc3 and ETc4 are determined, in step 330 ETc1 is determined, and the curve thereof generated, as described above in step 185. In one embodiment, ETc2, ETc3 and ETc4 are fused together to create ETc1. In one embodiment, ETc1 is generated using a weighted function, denoted wETc1. FIG. 5b illustrates two separate embodiments for generating ETc1.

In the first embodiment, historical curves of ETc2, ETc3 and ETc4, denoted respectively ETc2_hist, ETc3_hist and ETc4_hist, are evaluated against a historical ETc curve, denoted ETc_hist, such as an ETc curve measured, or estimated, from previous days in the current growing season, or in previous growing seasons. The term "historical ETc curve", as used herein, means a measured, or estimated, ETc curve from the past. In one embodiment, ETc_hist is estimated using RSP values and ET0, which in one embodiment estimated from estimated weather parameters. In one embodiment, ETc_hist is a measured ETc from the previous year or an aggregation of recent years. In another embodiment, ETc_hist is a measured ETc from a portion of the present growing season, such as the last few weeks. Similarly, a historical ETc2 curve is a previously calculated ETc2 curve, a historical ETc3 curve is a previously calculated ETc3 curve and a historical ETc4 curve is a previously calculated ETc4 curve. The historical period of ETc2_hist, ETc3_hist and ETc4_hist corresponds to the historical period of ETc_hist. Thus, previously determined curves of ETc2, ETc3 and ETc4 are compared to a measured, or estimated, ETc curve from a corresponding period to determine their accuracy. Particularly, in step 331, each of ETc2_hist, ETc3_hist and ETc4_hist are separately compared to ETc_hist, and an error between each of ETc2_hist, ETc3_hist and ETc4_hist, and ETc_hist is determined. In one embodiment, the error is determined for each of a plurality of points within the growing season. In another embodiment, the error is determined for each day of the growing season.

In step 332, the determined errors are analyzed to determine an accuracy metric for each of ETc2_hist, ETc3_hist and ETc4_hist. In one further embodiment, each accuracy metric is a predetermined function of the respective set of errors, such as a root-mean-squared-error (RMSE) function. In step 333, a respective predetermined function is applied to the determined accuracy metrics, the outcome of the applied predetermined function being the weights for each of ETc2, ETc3 and ETc4. Thus, a higher weight is assigned to ETc curves whose previous estimates were closer to ETc_hist, i.e. exhibit a lower error, and a lower weight is assigned to ETc curves whose previous estimates were further away from ETc_hist, i.e. exhibit a higher error. In one embodiment, the predetermined function applied to the accuracy metrics is the SoftMax function. The weight for ETc2 is denoted w2, the weight for ETc3 is denoted w3 and the weight for ETc4 is denoted w4. In step 334, weights w2, w3 and w4 are respectively applied to ETc2, ETc3 and ETc4 to determine ETc1. In one embodiment, ETc1 is determined as the sum of the weighted ETc curves, such that:

$$ETc1 = w2*ETc2 + w3*ETc3 + w4*ETc4 \qquad \text{EQ. 2}$$

In the second embodiment illustrated in FIG. 5b, in step 335, a predetermined function is applied to ETc2, ETc3 and ETc4. In one embodiment, the predetermined function is any of a moving average, a moving median or an ensemble Kalman filter (EnKF), without limitation. In such an embodiment, ETc1 is an outcome of the applied predetermined function. In one embodiment, ETc1 is dynamic and updated daily throughout the growing season for each plot, depending on the weather forecast. Each plot will have its own determined ETc1. ETc1 can be used for irrigation management since it estimates the water demand by the respective plot daily using up-to-date data.

Figure 6A:
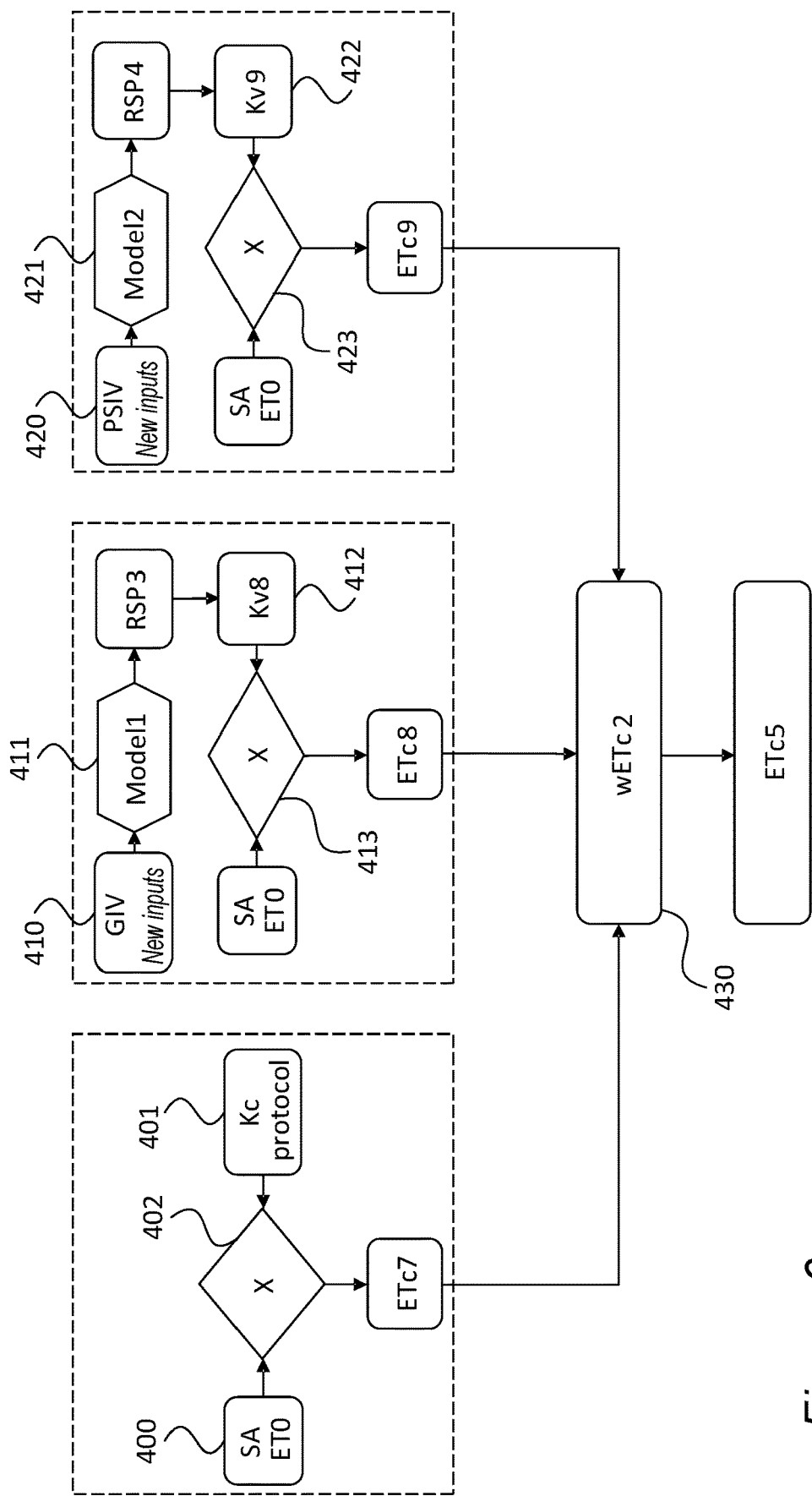
FIGS. 6a-6b illustrate high-level flow diagrams of various methods of generating a respective ETc curve, in accordance with some embodiments.

FIG. 6a illustrates a high-level flow diagram of a method of generating the curve of ETc5 by system 100, in accordance with some embodiments. In one embodiment, as described above, the method is performed by one or more processors 110 reading respective instructions stored in memory 120.

As described above, ETc5 is determined using ETc7, ETc8 and ETc9. As will be described below, ETc7, ETc8 and ETc9 are determined using a statistical aggregation (SA) of an ET0, and multiplying it by Kc or Kv, per plot. This SA ET0 is based on historical data and allows estimating ET0 for every day of the year, for each plot in the world. Particularly, in step 400, in one embodiment a statistical aggregation function of the received ET0 described above is determined. In another embodiment, the statistical aggregation values of the ET0 are received via communication unit 120. In one embodiment, the SA ET0 is the average evaporation per day, over a past predetermined number of years. In one further embodiment, the past predetermined number of years is 10.

In step 401, a crop coefficient Kc associated with the present field plot is received. In one embodiment, global or local Kc protocols are received, and Kc is determined responsive to the received global or local Kc protocols. In step 402, responsive to SA ET0 of step 400 and Kc of step 401, ETc7 is determined. In one embodiment, SA ET0 is multiplied with Kc and the outcome of the multiplication is ETc7.

In step 410, one or more values of one or more present/past GIVs are received. In one embodiment, the present/past GIV values are received from one or more external sources via communication unit 130. In another embodiment, various measurements or other data are received from one or more external sources, via communication unit 130, and processor 110 calculates or estimates one or more values of one or more present/past GIVs responsive to the received measurements/data. The term "present/past GIVs" means GIVs associated with present or past measurements/data, as opposed to forecast GIVs.

In step 411, global RSP model1 is applied the measured GIV value/s, as described above in relation to step 311. In step 412, the output RSP values of model1, denoted RSP3, are converted to a crop coefficient value, denoted Kv8, as described above in relation to step 312. In step 413, a curve of ETc8 is generated responsive to SA ET0 of step 400 and Kv8. In one embodiment, ETc8 values are determined responsive to the SA ET0 and Kv8 associated with the present plot. In another embodiment, the ETc8 curve is generated by multiplying SA ET0 with Kv8.

In step 420, one or more values of one or more present/past PSIVs are received. In one embodiment, the present/past PSIV values are received from one or more external sources via communication unit 130. In another embodiment, various measurements or other data are received from one or more external sources, via communication unit 130, and processor 110 calculates or estimates one or more values of one or more present/past PSIVs responsive to the received measurements/data. The term "present/past PSIVs" means PSIVs associated with present or past measurements/data, as opposed to forecast PSIVs.

In step 421, plot-specific RSP model2 is applied the past/present PSIV value/s, as described above in relation to step 321. In step 422, the output RSP values of model2, denoted RSP4, are converted to a crop coefficient value, denoted Kv9, as described above. In step 423, a curve of ETc9 is generated responsive to SA ET0 of step 400 and Kv9. In one embodiment, the ETc9 curve is generated by multiplying SA ET0 with Kv9.

Figure 6B:
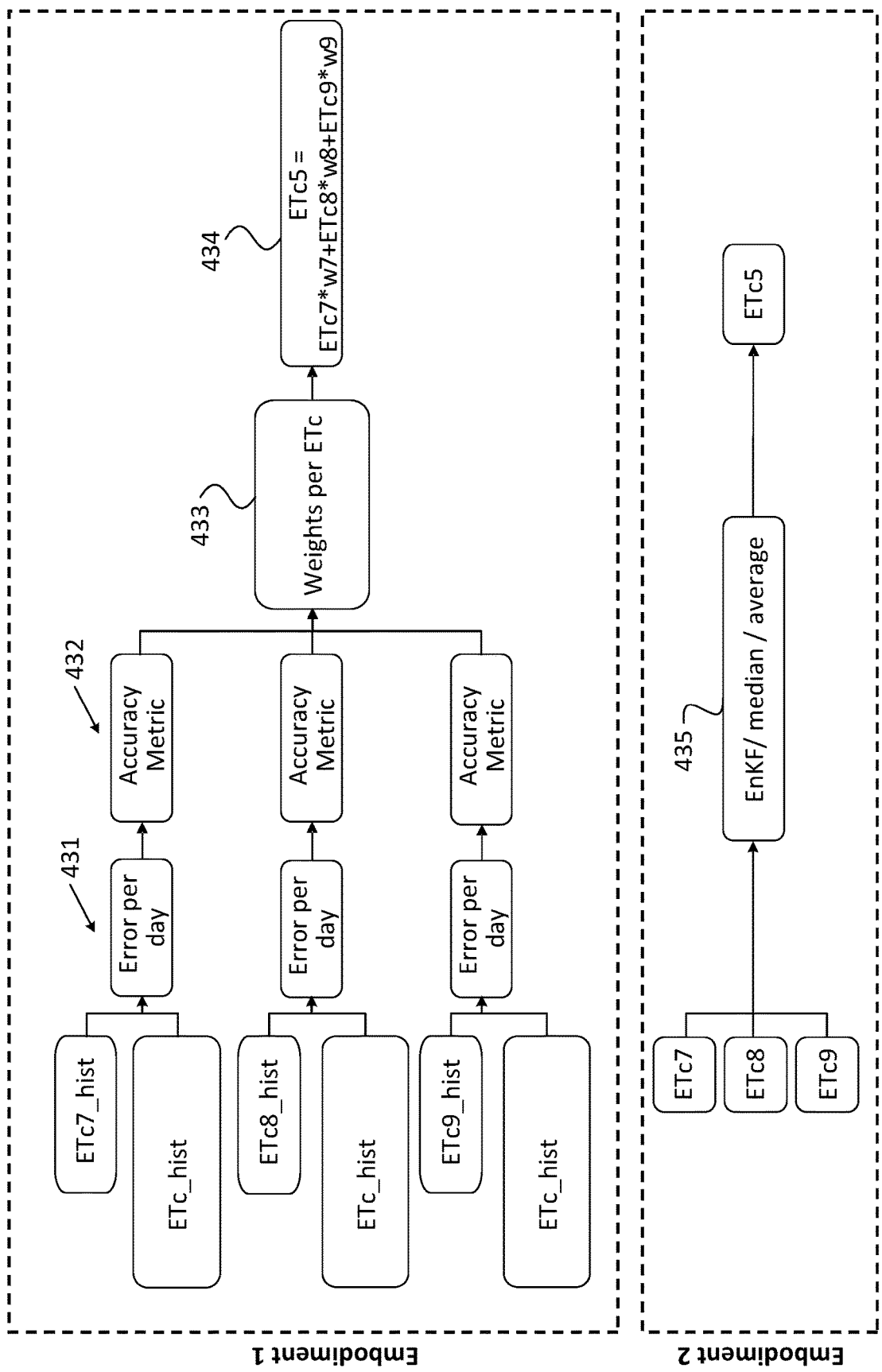

Once the ETc7, ETc8 and ETc9 are determined, in step 430 ETc5 is determined, and the curve thereof generated, as described above in step 186. In one embodiment, ETc7, ETc8 and ETc9 are fused together to create ETc5. In one embodiment, ETc5 is generated using a weighted function, denoted wETc2. FIG. 6b illustrates two separate embodiments for generating ETc5.

In the first embodiment, as described above in relation to wETc1, historical curves of ETc7, ETc8 and ETc9, denoted respectively ETc7_hist, ETc8_hist and ETc9_hist, are evaluated against historical ETc curve ETc_hist. Particularly, in step 431, each of ETc7_hist, ETc8_hist and ETc9_hist are separately compared to ETc_hist, and an error between each of ETc7_hist, ETc8_hist and ETc9_hist, and ETc_hist is determined. In one embodiment, the error is determined for each of a plurality of points within the growing season. In another embodiment, the error is determined for each day of the growing season.

In step 432, the determined errors are analyzed to determine an accuracy metric for each of ETc7_hist, ETc8_hist and ETc9_hist. In one further embodiment, each accuracy metric is a predetermined function of the respective set of errors, such as an RMSE function. In step 433, a respective predetermined function is applied to the determined accuracy metrics, the outcome of the applied predetermined function being the weights for each of ETc7, ETc8 and ETc9, as described in relation to step 333. Thus, a higher weight is assigned to ETc curves which are closer to ETc_hist, i.e. exhibit a lower error, and a lower weight is assigned to ETc curves which are further away from ETc_hist, i.e. exhibit a higher error. In one embodiment, the predetermined function applied to the accuracy metrics is the SoftMax function. The weight for ETc7 is denoted w7, the weight for ETc8 is denoted w8 and the weight for ETc9 is denoted w9. In step 434, weights w7, w8 and w9 are respectively applied to ETc7, ETc8 and ETc9 to determine ETc5. In one embodiment, ETc5 is determined as the sum of the weighted ETc curves, such that:

$$ETc5 = w7*ETc7 + w8*ETc8 + w9*ETc9 \qquad \text{EQ. 3}$$

In the second embodiment illustrated in FIG. 6b, in step 435, a predetermined function is applied to ETc7, ETc8 and ETc9, as described above in relation to step 335. In one embodiment, the predetermined function is any of a moving average, a moving median or an ensemble Kalman filter, without limitation. In such an embodiment, ETc5 is an outcome of the applied predetermined function. ETc5 can be used for water budget planning as it estimates the water demand by the crop at the present plot from the beginning of the growing season until its end. In one embodiment, ETc5, ETc7, ETc8 and ETc9 are each determined at the beginning of the growing season and do not change during the season.

Figure 7:
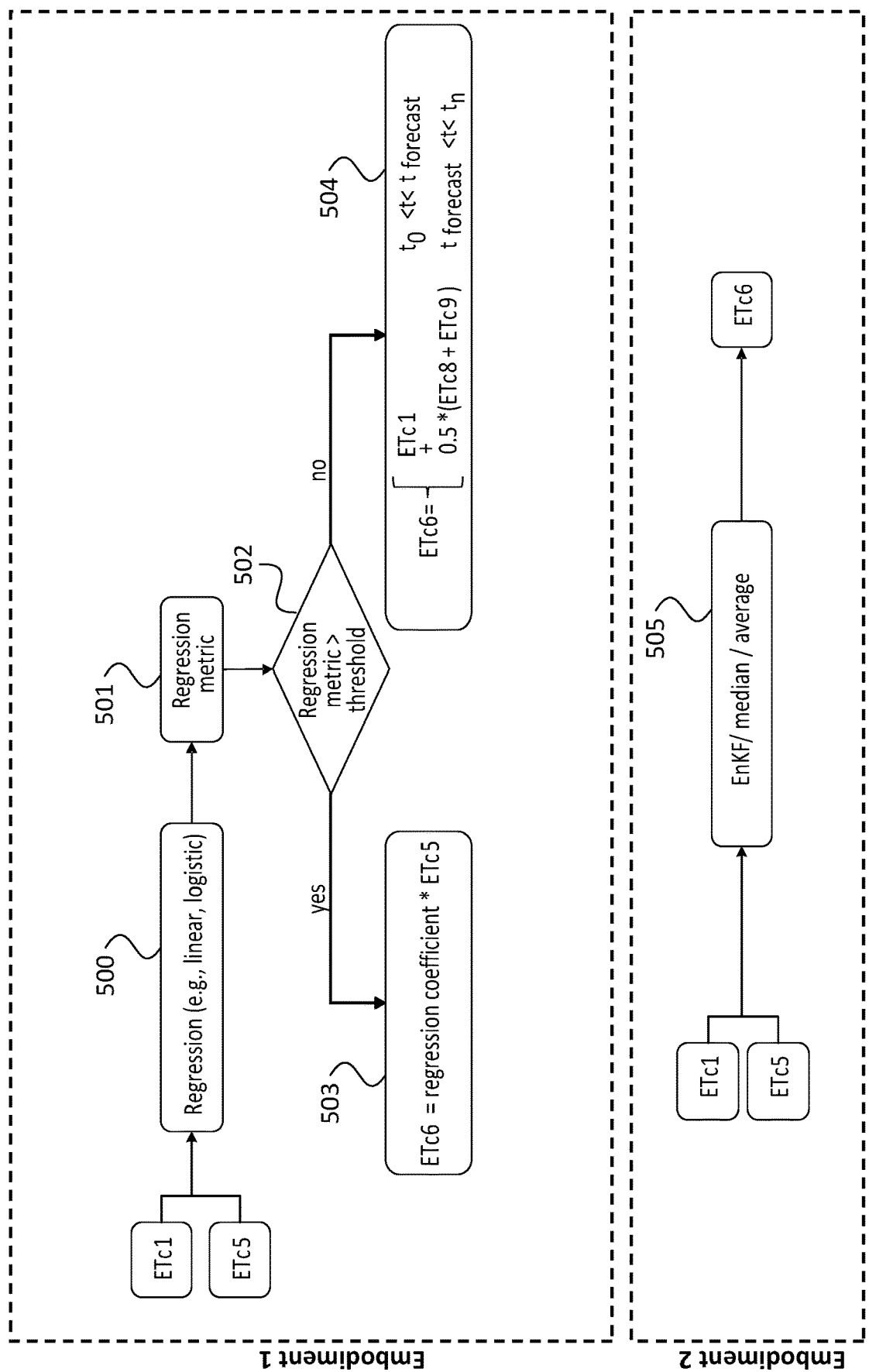
FIG. 7 illustrates high-level flow diagrams of various methods of generating a respective ETc curve, in accordance with some embodiments.

Once ETc1 and ETc5 are determined, ETc6 is determined, and the curve thereof generated, as described above in step 187. In one embodiment, ETc1 and ETc5 are fused together to create ETc6. In one embodiment, ETc6 is generated using a weighted function, denoted wETc3. FIG. 7 illustrates two separate embodiments for generating ETc6.

In the first embodiment, in step 500, the values of ETc1 and ETc5 are utilized to determine one or more regression functions defining the relationship therebetween. In one embodiment, the predetermined regression function is a linear regression function, a logistic regression function, or any other suitable regression function. In another embodiment, the predetermined regression function is defined such that ETc1 is a function of ETc5, i.e. ETc1=$f$(ETc5). In step 501 a regression metric of the applied regression function is determined. In one embodiment, the regression metric is a coefficient of determination.

In step 502, the determined regression metric is compared to a predetermined threshold. If the regression metric is greater than the predetermined threshold, the regression coefficients are deemed accurate enough, and in step 503 the regression coefficients of the applied regression function are used, together with ETc5, to determine ETc6. Particularly, in one embodiment, ETc6 is determined as the outcome of a multiplication of ETc5 with the regression coefficients. In one embodiment, responsive to a respective predetermined rule, the predetermined threshold can be periodically updated. For example, if the determined regression metric does not reach the predetermined threshold at least a predetermined percentage of the time, the predetermined threshold is lowered.

If the regression metric is not greater than the predetermined threshold, the regression coefficients are not deemed accurate enough. In such a case, in step 504, ETc6 is determined as comprising: the curve of ETc1 from the start of the growing season ($t_0$) to the end of the forecast period ($t_{forecast}$), i.e. the end of the time period where the forecasts of ET0, GIVs and PSIVs extend to; and a predetermined function of the curves of ETc8 and ETc9 from $t_{forecast}$ to the end of the growing season ($t_n$). In one embodiment, the predetermined function of the curves of ETc8 and ETc9 is the average thereof, i.e.:

$$ETc6=0.5*(ETc8+ETc9) \quad \text{EQ. 4}$$

In the second embodiment illustrated in FIG. 7, in step 505, a predetermined function is applied to ETc1 and ETc5, as described above in relation to step 335. In one embodiment, the predetermined function is any of a moving average, a moving median or an ensemble Kalman filter, without limitation. In such an embodiment, ETc6 is an outcome of the applied predetermined function. As described above in relation to step 188, ETc6 is used to provide the amount of water required for the field plot for the entire growing season. In one embodiment, the growing season water amount for the field plot is determined by determining a summation of ETc6, i.e. the sum of all ET6 values along the ETc5 curve. Advantageously, ETc6 provides an optimal and dynamic ETc until the end of the growing season, as it assimilates data collected both globally and local, historical, current, and forecast.

Figure 8A:
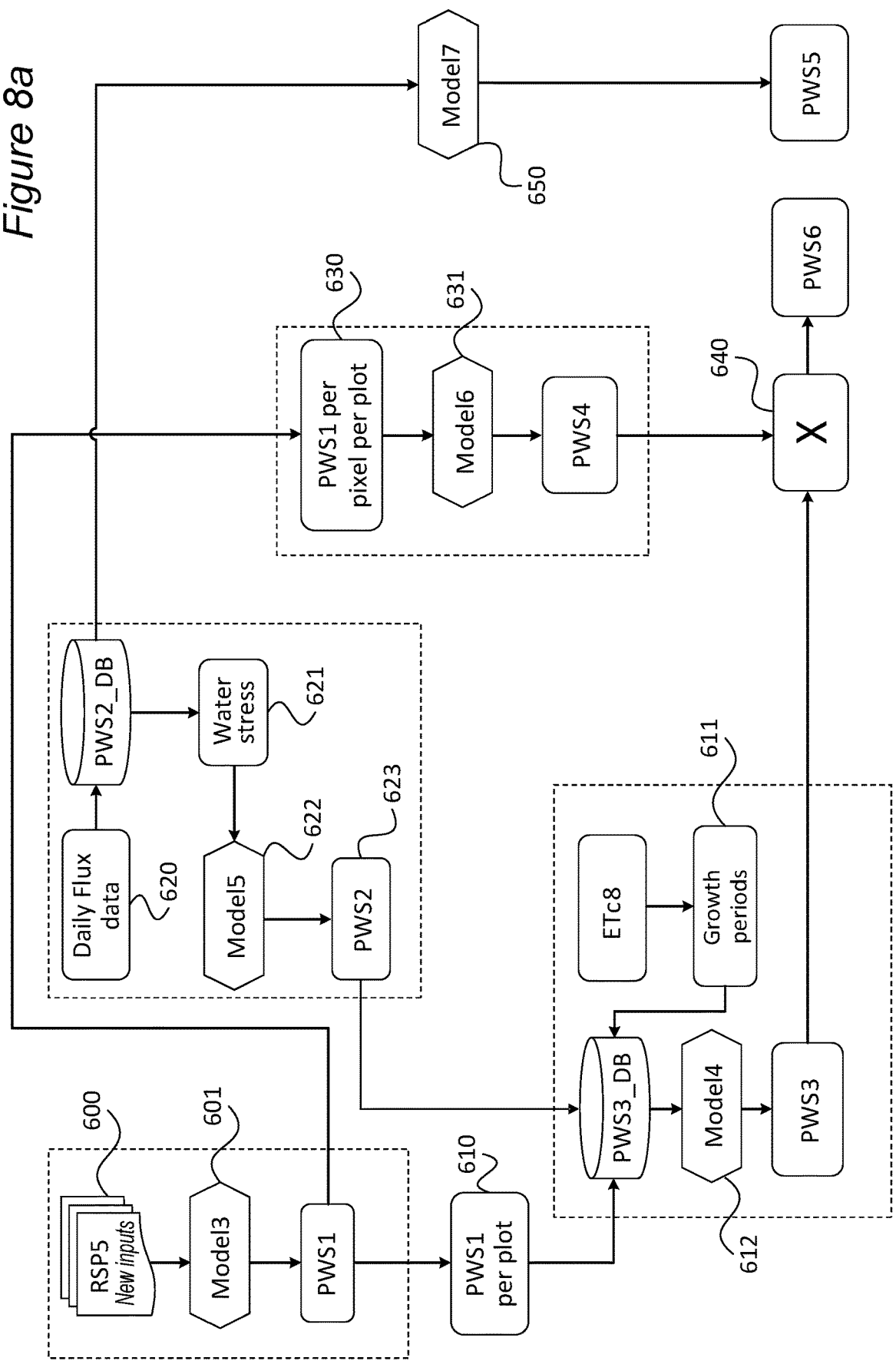
FIG. 8a illustrates a high-level flow diagram of a method generating respective PWS curves, in accordance with some embodiments.

As described above in relation to blocks 183 and 184 of FIG. 3B, a plurality of different stress coefficients are determined. FIG. 8a illustrates a high-level flow diagram of a method of generating these stress coefficients by system 100, in accordance with some embodiments. In one embodiment, as described above, the method is performed by one or more processors 110 reading respective instructions stored in memory 120.

In step 600, actual global RSP values are received, the RSP values denoted RSP5. The term "global RSP values", as used herein, means RSP values for a plurality of different plots from different geographical regions and field plots, and different crop types. The term "actual global RSP values", as used herein, means: global RSP values which are received from an external source, such as measured global RSP values; and/or calculated and/or estimated global RSP values, determined based on received measurement data, such as spectral indices. In one embodiment, RSP5 includes RSP measurements, calculations, and/or estimates, from the start of the growing season until the present. In step 601 a first PWS model, denoted model3, is applied to the actual RSP5 values. Model3 follows the general schema described above in relation to FIG. 4. The DB, or DBs, used to train model3 contains RSP values, from one or more RSP sources, as the independent variable, while the dependent variables are PWS values calculated from scientific devices that water stress can be derived from, such as flux towers or chambers, or pressure bombs, as shown in previous studies (e.g., as shown in Snyder R. L., et al., 2006, Agriculture and Forest Meteorology 139, 1-11; LeMone M. L., et al, 2007, Journal of Hydrometeorology 8, 68-87). These variables are combined into a respective DB for each RSP source, e.g., a respective DB for optic RSP, a respective DB for SAR RSP, and/or a respective DB for thermal RSP.

Thus, model3 represents a set of sub-models, each following PWS=$f$(RSP), which aims to find the relationship between each RSP (or multiple RSP values) and the corresponding PWS values. Thus, the output of model3 is a first set PWS coefficient values, denoted PWS1, regardless of the RSP type. As will be described below, in one embodiment, PWS1 comprises a plurality of subsets of PWS coefficient values, each of the plurality of subsets of PWS coefficient values being associated with a respective one of a plurality of portions of each field plot.

In step 610, PWS1 values for the entire plot are determined. In one embodiment, PWS1 values are determined for each plot associated with respective received global RSP values. In step 611, responsive to ETc8, a plurality of periods within the growing season are determined. In one embodiment, a piecewise regression is performed on ETc8 to determine the dates of the different periods. As described above, the plurality of periods are dependent on the growth of the crop within the field, and include in one embodiment an initial period, a development period, a mid-season period and a late-season period. Although 4 periods are described herein this is not meant to be limiting in any way.

In step 612, a second PWS model, denoted model4, is applied to the plot coefficients of PWS1, and additional PWS values, as will be described below. Model4 outputs respective PWS values, as will be described below. Additionally, processor 110 further determines PWS_max, or PWS_high, and PWS_opt values per growth period, per crop or group of crops for each defined geographical region (e.g. a country, municipal boundaries, etc.), from the determined PWS1 values. In one embodiment, PWS_opt is determined by fitting a curve to the minimum points of PWS1, as illustrated above in FIG. 2B. As described above, PWS1 comprises PWS values for many global plots and many crops, thus model4 can determine the PWS values for each crop and each geographical region. Thus, using model4, system 100 determines PWS_max, or PWS_high, and PWS_opt values for each crop, per region and growth period.

Although PWS1 provides water stress values for each plot, the values are based on RSP data, which is typically received at non-frequent intervals. As a result, PWS1 exhibits a relatively low temporal resolution. Thus, an additional PWS dataset, denoted PWS2, is input to model4. Particularly, in step 620, flux data and/or thermal measurements are received. In one embodiment, the flux data is daily flux data, or hourly flux data, received either from scientific flux devices or any other source of continuous daily flux datasets. In one embodiment, received data is saved in a respective database, denoted PWS2_DB. From the frequently received flux data, in step 621, system 100 calculates water stress values, such as the Bowen ratio, between the soil (sensible heat) and the crop (latent heat) fluxes, which is higher for stress sites (Wilson K. B., et al., 2002, Water Resources Research 38, 1294; LeMone M. L., et al, 2007, Journal of Hydrometeorology 8, 68-87). In another embodiment, system 100 utilizes the flux data to determine the ratio between the latent heat to the difference between the net radiation (Rn) and the soil heat flux (G), where values approaching 0.0 present dry and stressed conditions (Snyder R. L., et al., 2006, Agriculture and Forest Meteorology 139, 1-11). When no flux data is available, thermal measurements of the crop can be also used, by utilizing the crop water stress index, which normalizes the current crop condition with temperature of dry and wet conditions. In this index, values approaching 1.0 present dry and stressed conditions (Oshaughnessy, S. A., et al, 2012, Agricultural Water Management 107, 122-132).

In step 622, the determined water stress values are then converted to PWS values, which ranged between 0 and 1, using a respective model, denoted model5. In one embodiment, model5 is a mathematical operation such as, but not limited to, a MinMax scaler (Helman D., et al., 2017, Biogeosciences, 14, 3909-3926) or other published methods (e.g., Jackson R. D., et al., 1988, Irrigation Science 9, 309-317; Oshaughnessy, S. A., et al, 2012, Agricultural Water Management 107, 122-132). Model5 outputs a PWS seasonal curve and processor 110 further determines PWS_max, or PWS_high, and PWS_opt in accordance with the output PWS seasonal curve, as described above in relation to FIGS. 2a-2b, the PWS data denoted PWS2. Since flux data is not abundant over irrigated fields, the resultant PWS2, and its derivatives (PWS_max or PWS_high, and PWS_opt) are grouped into crop groups such as, but not limited to, evergreen, deciduous or field crops, where all other crops that do not have flux data, will be assigned to one of these groups. In step 623, the PWS2 datasets are provided to model4, and optionally stored in a respective database, denoted PWS3_DB, which also has stored therein the PWS1 datasets.

Thus, in such an embodiment, model4 has input thereto PWS1 values for each plot, PWS2 values for each crop type and the respective growing periods for the present field plot. The output of model4, denoted PWS3, comprises PWS_max, or PWS_high, and PWS_opt values for a plurality of crop types, including the crop in the present field plot. Thus, model4 fits PWS1, calculated from RSP values, to PWS2, calculated from flux data values. In one embodiment, model4 comprises a regression function, i.e. model4 determines a regression function defining the relationship between PWS1 and PWS2. In another embodiment, model4 is trained and defined as described above in relation to FIG. 4. In such an embodiment, model4 is trained using PWS1 as the independent variable and PWS2 as the dependent variable.

In one embodiment, an additional PWS dataset, denoted PWS4, is provided. Particularly, in step 630, PWS1 values for each of a plurality of portions the present field plot are determined. Particularly, system 100 estimates PWS1 values per pixel, or other predetermined plot portions. For each pixel, in step 631, a respective model, denoted model6, determines a difference, optionally in percentage, between the respective pixel and a representative PWS value of the field per growth period. In one embodiment, the representative PWS value comprises the mean or the median PWS value of all the pixels of the plot, without limitation. In one embodiment, each time new RSP values are received at step 600, the difference between the PWS value of each pixel is compared to the PWS value of the whole plot. In another embodiment, pixels that display low vegetation due to infrastructure constraints (e.g., pipes, structures, etc.) are masked in a way that removes them from the output. In one embodiment, the output of model6, denoted PWS4, is a series of raster maps (a map per growth period) of the field, where each pixel has a value of the difference in PWS from the PWS of the entire field. In one embodiment, where RSP values are received more than once in each growth period, there are several raster maps in each growth period.

Figure 8B:
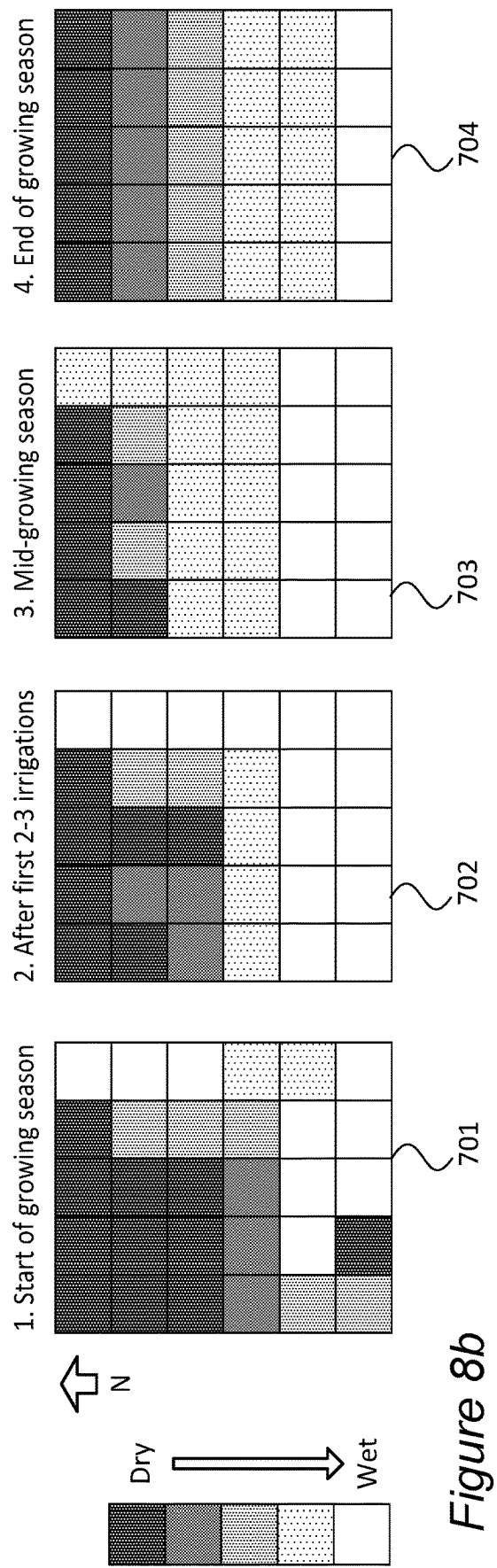
FIG. 8b illustrates an example of a series of raster maps of a field, in accordance with some embodiments.

FIG. 8b illustrates an example of such a series of raster maps. As illustrated, map 701 represents the plot at the start of the growing season. Map 702 represents the plot after a predetermined number of irrigations, such as 2-3 irrigations. Map 703 represents the plot in the middle of the growing season and map 704 represents the plot at the end of the growing season. As illustrated, the darker pixels are dryer and the lighter pixels are wetter.

In step 640, responsive to PWS4 and PWS3, PWS6 is determined. In one embodiment, PWS4 is multiplied by the derivatives of PWS3, i.e. PWS_high, or PWS_max, and PWS_opt, and PWS6 is equal to the outcome of the multiplication of PWS4 and PWS3. In one embodiment, PWS6 comprises a raster map per crop and per growth period and each pixel of each raster map comprises respective PWS_high, or PWS_max, and PWS_opt values. Thus, the global PWS values are improved by including the local geographical conditions. As a result, system 100 can determine the respective PWS values for any crop type. In one embodiment, PWS4 is not determined. In such an embodiment, PWS6 is equal to PWS3.

In step 650, the data stored in the PWS2_DB is input to a respective model, denoted model7. Model7 follows the general schema described above in relation to FIG. 4. The DB, or DBs, used to train model7 contain weather information, and/or crop growth period, and/or soil type, and/or other relevant parameters. The dependent variables for training model7 are PWS values extracted from the received flux data, or thermal measurements, of step 620. The output of model7, denoted PWS5, defines the reduction rate of PWS between subsequent wetting events. In one embodiment, PW5 defines the daily, or hourly, reduction rate of PWS between subsequent wetting events. The dates of the wetting events can be obtained either from user input or estimated by RSP values associated with the present field plot. The goal of model7 is to thus to determine the daily changes in PWS between two consecutive wetting events as a function of weather, crop, and field features/variables (Wilson K. B., et al., 2002, Water Resources Research 38, 1294).

Figure 2A:
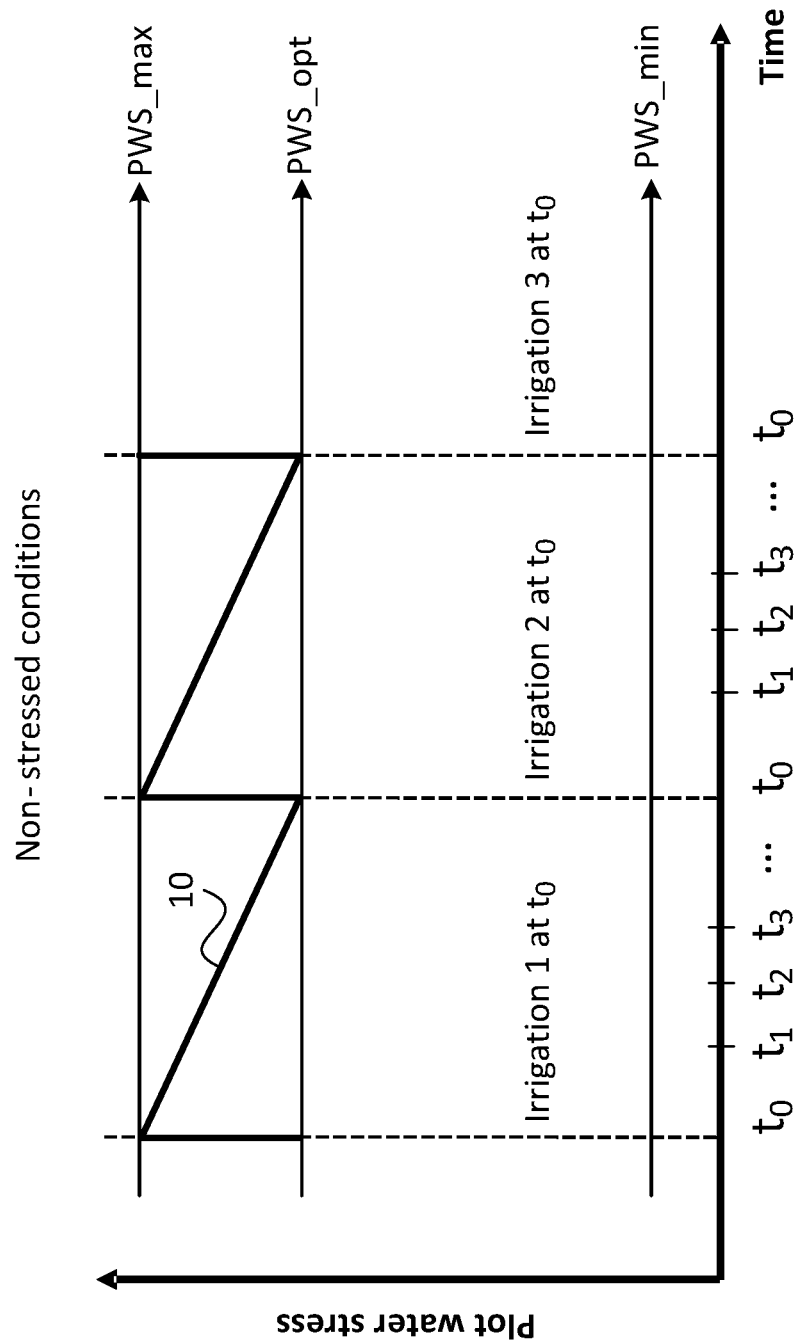
FIGS. 2a-2b illustrate exemplary graphs of plot water stress curves as a function of time, with distinguished wetting events.
Figure 2B:
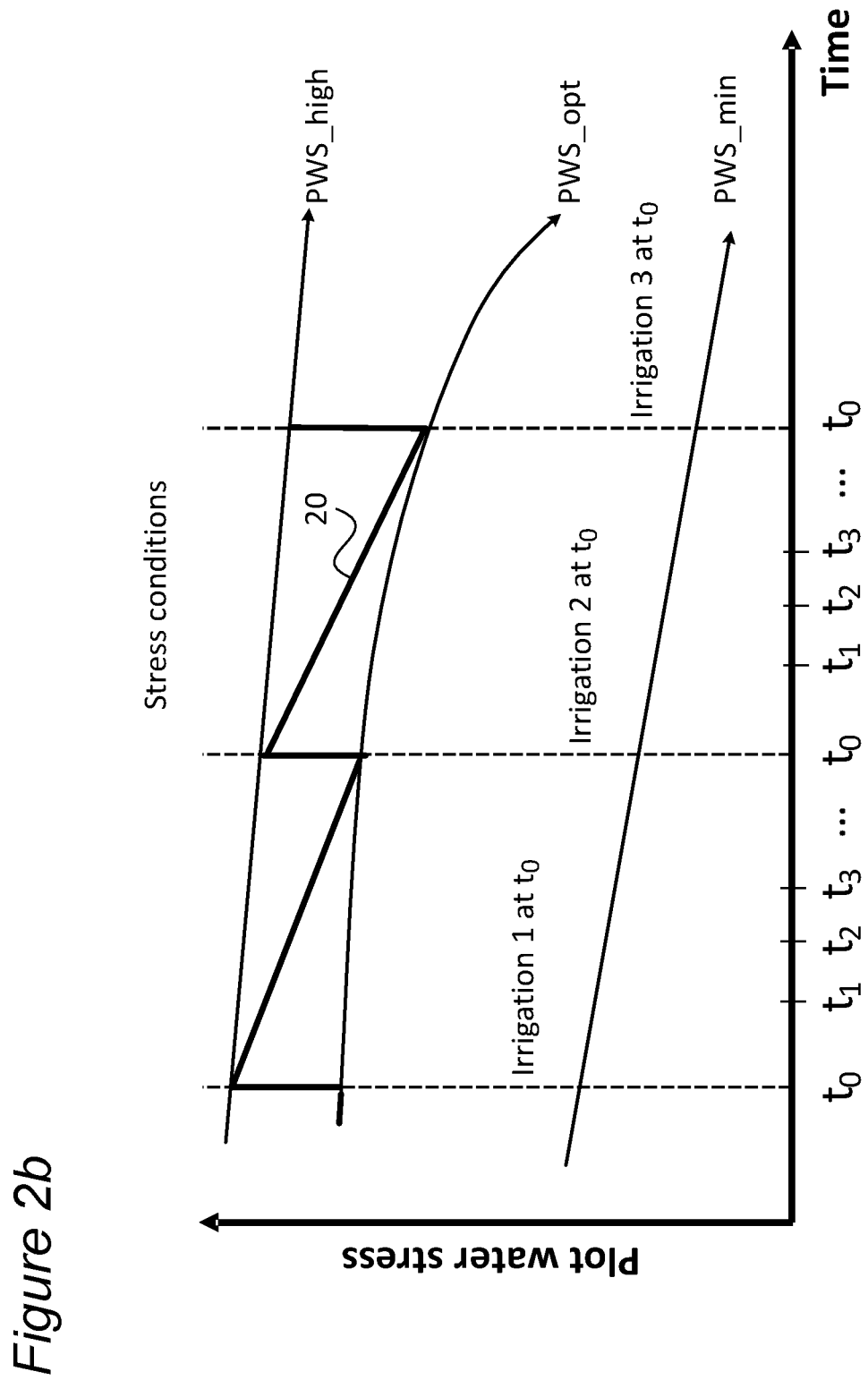

Since model7 is based mainly on weather and utilizes other variables that are constant for a specific field, model7 can produce forecasted daily PWS changes from PWS_max, or PWS_high, until it reaches the PWS_opt and determine the optimal time for next irrigation. Particularly, in step 192 of FIG. 3b, processor 110 determines the optimal time for the next irrigation responsive to PWS5 and PWS6. In one embodiment, the optimal time for the next irrigation is determined as the time value (x-axis value) in the intersection point between the forecasted PWS and PWS_opt, as illustrated in FIGS. 2a and 2b. In such an embodiment, the forecasted PWS is determined by adding (or subtracting) the reduction rate from the PWS values of PWS6.

In step 191 of FIG. 3b, responsive to PWS5 (which represents the forecast PWS until the next wetting date), PWS6 (which represents the past and present PWS) and ETc1, an additional ETc curve, denoted ETc10, is determined. In one embodiment, ETc10 is defined as:

$$ETc10 = ETc1((PWS\_high - PWS\_opt)/(PWS6 - PWS5)) \qquad \text{EQ. 5}$$

where PWS_high, or PWS_max, and PWS_opt are determined from PWS3. PWS6-PWS5 is performed for the present growth period, i.e. the PWS values of PWS6 that are associated with the growth period that the calculation is being performed in. The numerator, i.e. PWS_high (or PWS_max) minus PWS_opt, represents the stress strategy, while the denominator, i.e. PWS6 minus PWS5 is the current and forecast water stress values. If the denominator is lower than the numerator, the next irrigation should be greater because the actual stress is greater than what is planned, and vice versa. In step 191, processor 110 determines the amount of water for the next irrigation event from ETc10. Particularly, ETc10 indicates the amount of water that has evaporate. Thus, the amount of water in the next irrigation event is calculated to be enough to compensate for the evaporated water.

In one embodiment, the determined amount of water for the next irrigation event, the optimal date for the next irrigation event and/or the optimal amount of water for the entire growing season is output to an irrigation system, such as to user device 160. Receiving this information, the irrigation system can adjust the irrigation of the field plot. In one embodiment, system 100 controls the irrigation system to adjust the irrigation of the field plot in accordance with the determined information. Alternatively, a user can use the information received and adjust the irrigation of the field plot accordingly. Advantageously, in an embodiment where PWS4 is determined, irrigation information is provided for each pixel, or other defined portion, of the field plot.

Figure 9:
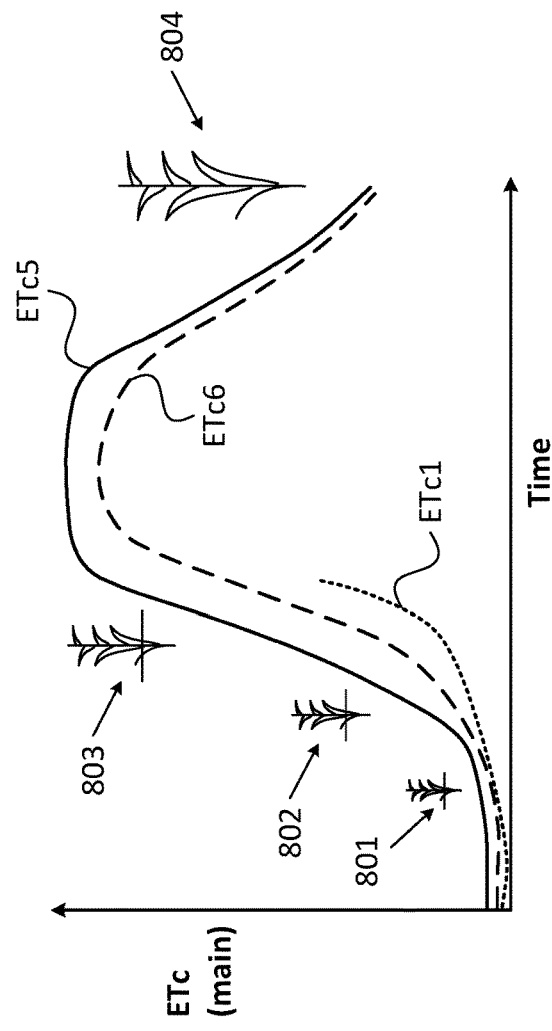
FIG. 9 illustrates a graph of various ETc curves, in accordance with some embodiments.

FIG. 9 illustrates a graph of the curves of ETc1, ETc5 and ETc6, where the x-axis represents time and the y-axis represents ETc values. Points 801, 802 and 803 represent the different growth periods within the growing season, and point 804 represents the harvest and end-of-season. As described above, ETc1 extends up until the time where the weather forecasts reach.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination. The term "another embodiment", as used herein, is not meant to be limited to an exclusively alternative embodiment and may be practice in addition to other embodiments as well.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

The invention claimed is:

1. A computerized method for managing irrigation of a crop in a field plot for a growing season, the method comprising:
   receiving values of one or more forecast global independent variables (GIVs);
   applying a global remote sensing product (RSP) model to the received values of the forecast GIVs and, responsive to the applied global RSP model, determining forecast global RSP values;
   receiving values of forecast plot-specific independent variables (PSIVs) associated with the field plot;
   applying a plot-specific RSP model to the received values of the forecast PSIVs and, responsive to the applied plot-specific RSP model, determining forecast plot-specific RSP values;
   receiving a forecasted reference evapotranspiration (ET0) associated with the field plot; and
   receiving one or more actual plot-specific RSP values associated with the field plot,
   wherein, responsive to the forecast global RSP values, the forecast plot-specific RSP values, the forecast ET0 and the actual plot-specific RSP values, the method further comprises:
      generating a first crop evapotranspiration (ETc) curve;
      responsive to the generated first ETc curve, determining a growing season water amount for the field plot and/or determining a next irrigation water amount for the field plot; and
      outputting to a device the determined growing season water amount and/or the determined next irrigation water amount such that irrigation of the field plot can be adjusted.

2. The method of claim 1, wherein the global RSP model comprises a plurality of sub-models, each of the plurality of sub-models associated with a respective global attribute.

3. The method of claim 1, wherein the receiving values of forecast GIVs is performed at respective predetermined intervals during the growing season,
   wherein the receiving values of forecast PSIVs is performed at respective predetermined intervals during the growing season, and
   wherein the receiving actual plot-specific RSP values is performed at respective predetermined intervals during the growing season.

4. The method according to claim 1, further comprising:
   responsive to the actual plot-specific RSP values and the forecast ET0, generating a second ETc curve;

responsive to the forecast global RSP values and the forecast ET0, generating a third ETc curve; and responsive to the forecast plot-specific RSP values and the forecast ET0, generating a fourth ETc curve, wherein the generation of the first ETc curve is responsive to the second, third and fourth ETc curves.

5. The method according to claim 4, further comprising:

determining a respective difference between a historical ETc curve associated with the field-plot and historical curves of the second, third and fourth ETc curves; and responsive to the determined differences, determining a respective weight for each of the second, third and fourth ETc curves, wherein the generation of the first ETc curve is further responsive to the respective weights for each of the second, third and fourth ETc curves.

6. The method according to claim 1, further comprising:

receiving values of past/present GIVs;

applying the global RSP model to the received values of the past/present GIVs and, responsive to the applied global RSP model, determining seasonal global RSP values;

receiving values of past/present PSIVs associated with the field plot;

applying the plot-specific RSP model to the received values of the past/present PSIVs and, responsive to the applied plot-specific RSP model, determining seasonal plot-specific RSP values;

receiving a value associated with a historical ET0 associated with the field plot; and receiving a crop coefficient (Kc) associated with the field plot, wherein, responsive to the seasonal global RSP values, the seasonal plot-specific RSP values, the historical ET0 value and the Kc, the method further comprises:

generating a fifth ETc curve; and responsive to the determined fifth ETc curve and the generated first ETc curve, generating a sixth ETc curve, the determination of the growing season water amount for the field plot responsive to the generated sixth ETc curve.

7. The method according to claim 6, further comprising performing a summation of the sixth ETc curve, the determination of the growing season water amount for the field plot responsive to an outcome of the summation of the sixth ETc curve.

8. The method according to claim 6, further comprising:

responsive to the historical ET0 value and the Kc, generating a seventh ETc curve;

responsive to the seasonal global RSP values and the historical ET0 value, generating an eighth ETc curve; and responsive to the seasonal plot-specific RSP values and the historical ET0 value, generating a ninth ETc curve, wherein the generation of the fifth ETc curve is responsive to the seventh, eighth and ninth ETc curves.

9. The method according to claim 8, further comprising:

determining a respective difference between a historical ETc curve associated with the field-plot and historical curves of each of the seventh, eighth and ninth ETc curves; and responsive to the determined differences, determining a respective weight for each of the seventh, eighth and ninth ETc curves, wherein the generation of the fifth ETc curve is further responsive to the respective weights for each of the seventh, eighth and ninth ETc curves.

10. The method according to claim 8, further comprising:

responsive to the first ETc curve and the fifth ETc curve, determining one or more regression functions defining a relationship between the first ETc curve and the fifth ETc curve; and comparing a regression metric of the determined one or more regression functions to a predetermined threshold, wherein, responsive to an outcome of the comparison indicating that the regression metric is greater than the predetermined threshold, the sixth ETc curve is a product of the fifth ETc curve and regression coefficients of the predetermined regression function, and wherein, responsive to the outcome of the comparison indicating that the regression metric is not greater than the predetermined threshold, the sixth ETc curve is a respective predetermined function of the first ETc curve, the eight ETc curve and the ninth ETc curve.

11. The method according to claim 8, wherein the sixth ETc curve is a respective predetermined function of the first and fifth ETc curves.

12. The method according to claim 8, further comprising:

receiving actual global RSP values;

applying a first plot water stress (PWS) model to the received actual global RSP values measured plot-specific RSP values and, responsive to the applied first PWS model, determining a first set of PWS coefficient values for global plots;

responsive to the generated eighth ETc curve, defining a plurality of periods within the growing season associated with growth phases of the crop;

applying a second PWS model to the determined first set of PWS coefficient values and, responsive to the applied second PWS model, determining a past/present PWS curve for a crop of the field plot for each of the plurality of periods;

receiving flux data and/or thermal measurements of the global plots;

applying a third PWS model to the received flux data and/or thermal measurements;

responsive to the applied third PWS model, determining a second set of PWS coefficient values for the field plot, the second set of PWS coefficient values for the field plot input into the second PWS model such that the determined past/present PWS curve is responsive to the second set of PWS coefficient values;

applying a fourth PWS model to the receive flux data and/or thermal measurements;

responsive to the applied fourth PWS model, determining a PWS reduction rate;

responsive to the determined PWS reduction rate and the past/present PWS curve, determining forecast PWS values for the field plot; and responsive to the determined past/present PWS curve, the determined forecast PWS values and the first ETc curve, generating a tenth ETc curve, wherein the determination of the next irrigation water amount for the field plot is responsive to the generated tenth ETc curve.

13. The method of claim 12, wherein the first set of PWS coefficient values comprises a plurality of subsets of PWS coefficient values, each of the plurality of subsets associated with a respective one of a plurality of portions of the field plot, wherein the method further comprises applying a fifth PWS model to the first set of PWS coefficient values and, responsive to the applied fifth PWS model, determining a respective optimal PWS curves for each of the plurality of portions of the field plot for each of the plurality of periods, and wherein the generation of the tenth ETc curve is further responsive to the respective optimal PWS curves for each of the plurality of portions of the field plot.

14. The method of claim 12, further comprising, responsive to the forecast PWS values for the field plot, determining an optimal date for the next irrigation of the field plot.

15. A system for managing irrigation of a crop in a field plot for a growing season, the system comprising:
one or more processors;
a communication unit; and
a memory, the memory having a plurality of instructions stored thereon, the plurality of instructions arranged, when executed by the one or more processors, to cause the one or more processors to:
responsive to the communication unit, receive values of one or more forecast global independent variables (GIVs);
apply a global remote sensing product (RSP) model to the received values of the forecast GIVs and, responsive to the applied global RSP model, determine forecast global RSP values;
responsive to the communication unit, receive values of forecast plot-specific independent variables (PSIVs) associated with the field plot;
applying a plot-specific RSP model to the received values of the forecast PSIVs and, responsive to the applied plot-specific RSP model, determining forecast plot-specific RSP values;
responsive to the communication unit, receive a forecasted reference evapotranspiration (ET0) associated with the field plot; and
responsive to the communication unit, receive one or more actual plot-specific RSP values associated with the field plot,
wherein, responsive to the forecast global RSP values, the forecast plot-specific RSP values, the forecast ET0 and the actual plot-specific RSP values, the plurality of instructions are further arranged to cause the one or more processors to:
generate a first crop evapotranspiration (ETc) curve;
responsive to the generated first ETc curve, determine a growing season water amount for the field plot and/or determine a next irrigation water amount for the field plot; and
output, via the communication unit, to a device the determined growing season water amount and/or the determined next irrigation water amount such that irrigation of the field plot can be adjusted.

16. The system of claim 15, wherein the global RSP model comprises a plurality of sub-models, each of the plurality of sub-models associated with a respective global attribute.

17. The system of claim 15, wherein the receipt of values of forecast GIVs is performed at respective predetermined intervals during the growing season, wherein the receipt of values of forecast PSIVs is performed at respective predetermined intervals during the growing season, and wherein the receipt of actual plot-specific RSP values is performed at respective predetermined intervals during the growing season.

18. The system according to claim 15, wherein the plurality of instructions are further arranged to cause the one or more processors to:
responsive to the actual plot-specific RSP values and the forecast ET0, generate a second ETc curve;
responsive to the forecast global RSP values and the forecast ET0, generate a third ETc curve; and
responsive to the forecast plot-specific RSP values and the forecast ET0, generate a fourth ETc curve,
wherein the generation of the first ETc curve is responsive to the second, third and fourth ETc curves.

19. The system according to claim 18, wherein the plurality of instructions are further arranged to cause the one or more processors to:
determine a respective difference between a historical ETc curve associated with the field-plot and historical curves of the second, third and fourth ETc curves; and
responsive to the determined differences, determine a respective weight for each of the second, third and fourth ETc curves, and
wherein the generation of the first ETc curve is further responsive to the respective weights for each of the second, third and fourth ETc curves.

20. The system according to claim 15, wherein the plurality of instructions are further arranged to cause the one or more processors to:
responsive to the communication unit, receive values of past/present GIVs;
apply the global RSP model to the received values of the past/present GIVs and, responsive to the applied global RSP model, determine seasonal global RSP values;
responsive to the communication unit, receive values of past/present PSIVs associated with the field plot;
apply the plot-specific RSP model to the received values of the past/present PSIVs and, responsive to the applied plot-specific RSP model, determine seasonal plot-specific RSP values;
responsive to the communication unit, receive a value associated with a historical ET0 associated with the field plot; and
responsive to the communication unit, receive a crop coefficient (Kc) associated with the field plot, and
wherein, responsive to the seasonal global RSP values, the seasonal plot-specific RSP values, the historical ET0 value and the Kc, the plurality of instructions are further arranged to cause the one or more processors to:
generate a fifth ETc curve; and
responsive to the determined fifth ETc curve and the generated first ETc curve, generate a sixth ETc curve, the determination of the growing season water amount for the field plot responsive to the generated sixth ETc curve.

* * * * *